US010232519B2

(12) United States Patent
Terada

(10) Patent No.: US 10,232,519 B2
(45) Date of Patent: Mar. 19, 2019

(54) ROBOT AND METHOD OF CONTROLLING THE SAME

(71) Applicant: TOYOTA JIDOSHA KABUSHIKI KAISHA, Toyota-shi (JP)

(72) Inventor: Koji Terada, Nagakute (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 100 days.

(21) Appl. No.: 14/914,506

(22) PCT Filed: Jul. 29, 2014

(86) PCT No.: PCT/JP2014/003975
§ 371 (c)(1),
(2) Date: Feb. 25, 2016

(87) PCT Pub. No.: WO2015/029331
PCT Pub. Date: Mar. 5, 2015

(65) Prior Publication Data
US 2016/0214263 A1 Jul. 28, 2016

(30) Foreign Application Priority Data

Aug. 30, 2013 (JP) .................................. 2013-179219

(51) Int. Cl.
*B25J 19/06* (2006.01)
*G05D 1/02* (2006.01)
(52) U.S. Cl.
CPC ............ *B25J 19/06* (2013.01); *G05D 1/0214* (2013.01); *G05D 1/0274* (2013.01)
(58) Field of Classification Search
CPC ..... B25J 19/06; B25J 19/1676; G05D 1/0214; G05D 1/0274; G05D 2201/0207; Y10S 901/01
See application file for complete search history.

(56) References Cited

U.S. PATENT DOCUMENTS 5,570,285 A    10/1996  Asaka et al.
2002/0013641 A1*  1/2002  Nourbakhsh ........ G05D 1/0214
                                                          700/245
(Continued)

FOREIGN PATENT DOCUMENTS

JP    07-200061 A    8/1995
JP    2009-294934 A   12/2009
(Continued)

OTHER PUBLICATIONS

International Search Report dated Nov. 4, 2014, in PCT/JP2014/003975 Filed Jul. 29, 2014.
(Continued)

*Primary Examiner* — Khoi H Tran
*Assistant Examiner* — Robert T Nguyen
(74) *Attorney, Agent, or Firm* — Oblon, McClelland, Maier & Neustadt, L.L.P.

(57) ABSTRACT

An object of the present invention is to provide a robot that can improve safety even when the robot is operated in an unobserved region and a method of controlling the robot. The robot according to the present invention operates while observing a surrounding environment. The robot includes environmental information obtaining means for obtaining environmental information on the environment around the robot and control means for reducing a driving force of the robot when the robot is operated in the unobserved region, in which region the environmental information thereof has not been obtained by the environmental information obtaining means.

9 Claims, 22 Drawing Sheets

(56) References Cited

U.S. PATENT DOCUMENTS

| | | | |
|---|---|---|---|
| 2010/0087955 A1 | 4/2010 | Tsusaka et al. | |
| 2012/0197439 A1* | 8/2012 | Wang | B25J 9/1689 |
| | | | 700/259 |
| 2012/0310411 A1* | 12/2012 | Tsuboi | B25J 9/1674 |
| | | | 700/245 |
| 2015/0121710 A1* | 5/2015 | McMurtry | G01B 21/045 |
| | | | 33/503 |
| 2018/0099410 A1* | 4/2018 | Hannya | B25J 9/1651 |
| 2018/0188733 A1* | 7/2018 | Iandola | G05D 1/024 |

FOREIGN PATENT DOCUMENTS

| | | |
|---|---|---|
| JP | 2010-134656 A | 6/2010 |
| JP | 2012-051080 | 3/2012 |
| WO | 2009/001550 A1 | 12/2008 |

OTHER PUBLICATIONS

Miura, et al., "Adaptive Robot Speed Control Considering Map and Motion Uncertainties in Unknown Environments," Journal of the Robotics Society of Japan, vol. 24, No. 1, Jan. 2006, 9 pages.

\* cited by examiner

HIGH SPEED

REGION OBSERVED & INCLUDES OBSTACLE (PROHIBITED REGION)

INDEFINITE REGION NOT OBSERVED (UNOBSERVED REGION)

REGION OBSERVED & INCLUDES NO OBSTACLE (FREE REGION)

REGION OBSERVED & INCLUDES OBSTACLE (PROHIBITED REGION)

INDEFINITE REGION NOT OBSERVED (UNOBSERVED REGION)

REGION OBSERVED & INCLUDES NO OBSTACLE (FREE REGION)

HIGHLY ACCURATE WORK WITH HIGH GAIN

ROBOT AND METHOD OF CONTROLLING THE SAME

TECHNICAL FIELD

The present invention relates to a robot and a method of controlling the same.

BACKGROUND ART

Patent Literature 1 discloses a robot that can move an arm or the like close to an object while recognizing the object. The robot calculates a recognition space into which the arm is prevented from entering based on position information of a camera and position information of a gripping object. The recognition space indicates a space in which recognition of the gripping object is prevented due to the arm entering. Then, the robot calculates an arm trajectory that avoids entry of the arm to the recognition space and controls the arm.

CITATION LIST

Patent Literature

Patent Literature 1: Japanese Unexamined Patent Application Publication No. 2012-51080

SUMMARY OF INVENTION

Technical Problem

In the above robot, as a range that can be observed by a camera or the like is limited, there are regions that remain unobserved. However, when the robot is completely prevented from entering the region not recognized (observed) by the robot, an operation of the robot will be limited, and thus the robot cannot sufficiently perform expected operations. On the other hand, when the robot is allowed to enter the region not recognized by the robot (for example, when the robot moves the arm in the region), the robot may come into contact with an obstacle and the like in the region.

The present invention has been made based on the above findings, and an object of the present invention is to provide a robot that can be operated with improved safety even when the robot is operated in an unobserved region and a method of controlling the robot.

Solution to Problem

A first exemplary aspect of the present invention is a robot operating while observing a surrounding environment that includes: environmental information obtaining means for obtaining environmental information on the environment around the robot; and control means for reducing a driving force of the robot when the robot is operated in an unobserved region, in which the environmental information on the unobserved region has not being obtained by the environmental information obtaining means.

A second exemplary aspect of the present invention is a method of controlling a robot that operates while observing a surrounding environment including the steps of: obtaining environmental information on the environment around the robot; determining as to whether or not the robot is operating in an unobserved region, in which the environmental information on the unobserved region has not being obtained; and reducing a driving force of the robot when it is determined that the robot is operating in the unobserved region.

Advantageous Effects of Invention

According to the above exemplary aspect, it is possible to provide a robot that can improve safety even when the robot is operated in an unobserved region and a method of controlling the robot.

DESCRIPTION OF EMBODIMENTS

Hereinafter, preferred exemplary embodiments of the present invention will be explained with reference to the drawings. Specific numeric values or the like shown in the following exemplary embodiments are merely illustrative for easier understanding of the invention, and unless otherwise particularly specified, the invention is not limited to them. Further, in the following descriptions and drawings, the matters and the like that are obvious to those skilled in the art have been omitted or simplified for clarity of the explanation.

First Exemplary Embodiment

Figure 1:
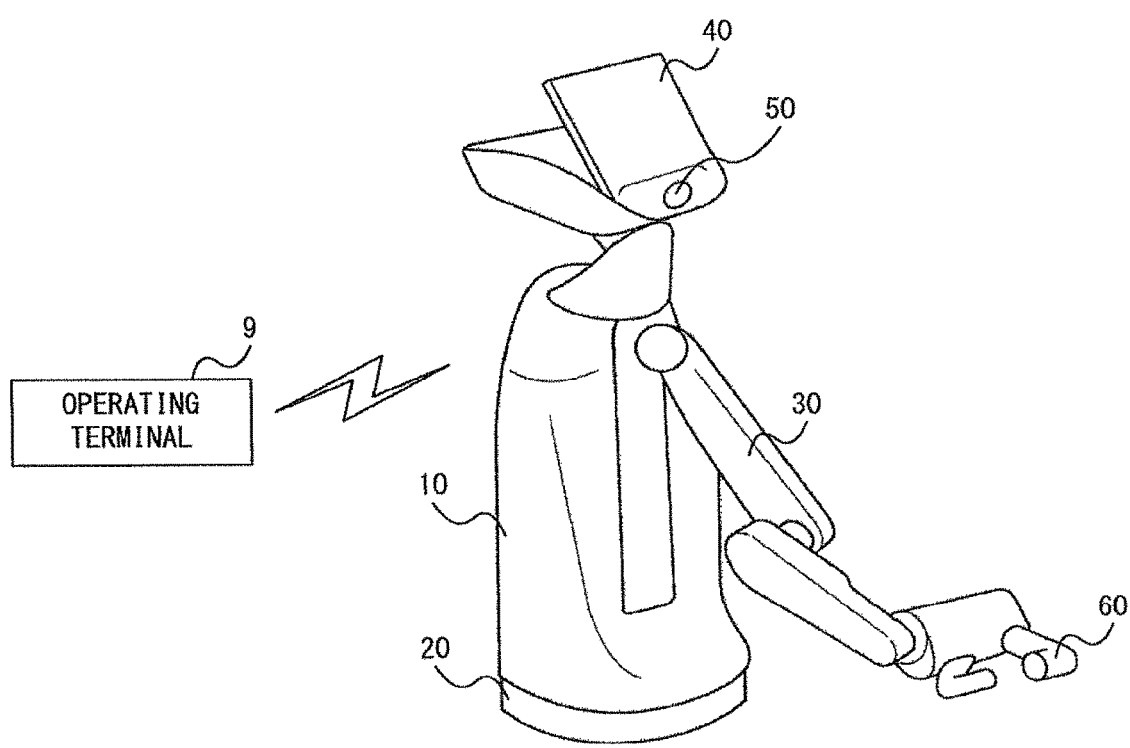
FIG. 1 is an external configuration diagram of a robot according to a first exemplary embodiment.

Firstly, a robot 1 according to a first exemplary embodiment will be explained. An external configuration of the robot 1 according to the first exemplary embodiment will be explained with reference to FIG. 1. FIG. 1 is an external configuration diagram of the robot 1 according to the first exemplary embodiment.

The robot 1 includes a robot body 10, a moving carriage 20, an arm 30, and a head 40. The robot 1 is typically a life supporting robot that carries out work performed by a person at home on behalf of the person. The robot 1 carries out work such as moving to an arbitrary place, picking up an object and delivering it to a person, opening a window and the like.

An upper part of the moving carriage 20 is coupled to a lower part of the robot body 10 in order to support the robot body 10 above the moving carriage 20. The moving carriage 20 drives wheels (not shown) provided at a lower part of the moving carriage 20 so as to move the robot 1.

The arm 30 is connected to a front part of the robot body 10 in such a way that the arm 30 projects forward of the robot body 10. The arm 30 is an articulated arm. The arm 30 includes a grip (gripping part) 6 that can grip an arbitrary object at a tip of the arm 30. Then, the robot 1 adjusts an angle of each joint of the arm 30 to move the grip 60 to a desired position and can grip an object present at the position.

The head 40 is coupled to an upper part of the robot body 10 in such a way that the head 40 is supported by the robot body 10 above the robot body 10. A sensor 50 is mounted on a front part of the head 40 so that a front region of the head 40 can be observed by the sensor 50. The sensor 50 is a sensor that observes an environment around the robot 1 and obtains environmental information indicating the observed environment. The sensor 50 is typically a three-dimensional distance sensor that can observe a distance from the robot 1 to an object around the robot 1. The three-dimensional distance sensor may be any one of sensors of various systems such as an optical sensor, an ultrasonic sensor, a laser beam sensor and the like. Note that means for obtaining the environmental information as the sensor 50 is not limited to the three-dimensional distance sensor. For example, a camera may be included as the sensor 50 to obtain image information indicating images captured by the camera as the environmental information.

An angle range of the sensor 50 that can be measured is limited to a predetermined angle. On the other hand, a part where the head 40 is coupled to the robot body 10 has a joint structure with multiple degrees of freedom to enable the head 40 to be operable. When the coupled part has at least two degrees of freedom or greater as the joint structure, the head 40 can be operated at least vertically and horizontally. Then, even when the angle range that can be measured by the sensor 50 is limited, a wide range can be observed by operating the head 40.

An operating terminal 9 is an information processing terminal that can communicate with the robot 1 wirelessly or through a wire. In this exemplary embodiment, an example in which the operating terminal 9 wirelessly communicates with the robot 1 will be explained. Although the operating terminal 9 may be a stationary information processing terminal such as a desktop PC, it may be preferably a portable information processing terminal so that a user can operate the robot 1 in a living space without limitation. The portable information processing terminal is a smartphone, a tablet terminal or the like.

The user can instruct the robot 1 to perform the above work performed by a person by the operating terminal 9. The robot 1 can carry out the work instructed by the user on behalf of the user. In this way, the robot 1 can support the user's life.

With the above configuration, when the robot 1 carries out the work instructed by the user, the robot 1 observes the environment around the robot 1 by the sensor 50 and moves so as to avoid obstacles in the observed environment.

Figure 2:
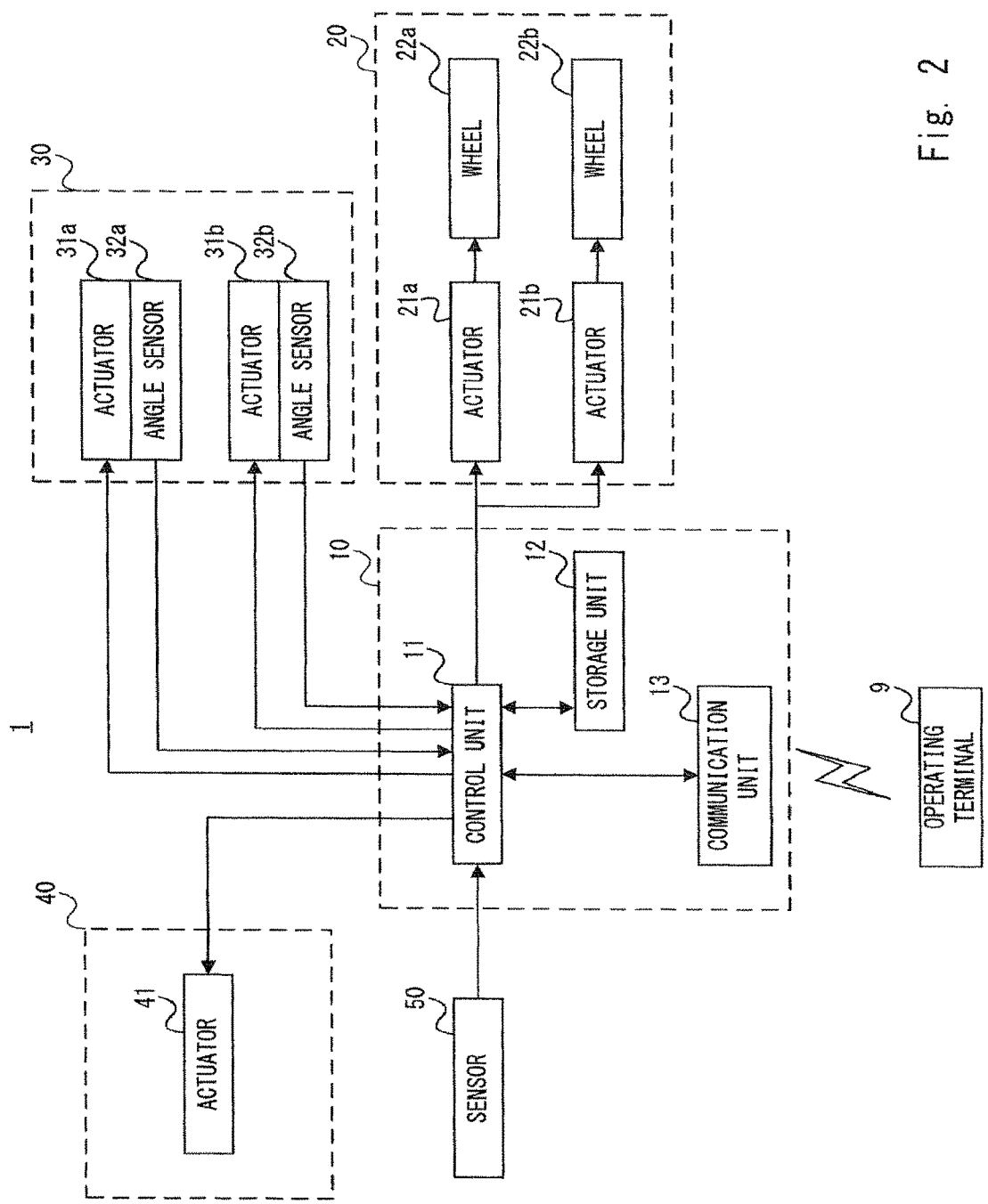
FIG. 2 is an internal configuration diagram of the robot according to the first exemplary embodiment.

Next, an internal configuration of the robot 1 according to the first exemplary embodiment will be explained by referring to FIG. 2. FIG. 2 is an internal configuration diagram of the robot 1 according to the first exemplary embodiment.

The robot 1 includes a control unit 11, a storage unit 12, a communication unit 13, actuators 21*a* and 21*b*, wheels 22*a* and 22*b*, actuators 31*a* and 31*b*, angle sensors (potentiometers) 32*a* and 32*b*, and an actuator 41. The control unit 11, the storage unit 12, and the communication unit 13 are included in the robot body 10. The actuators 21*a* and 21*b* and the wheels 22*a* and 22*b* are included in the moving carriage 20. The actuators 31*a* and 31*b* and the angle sensors 32*a* and 32*b* are included in the arm 30. The actuator 41 is included in the head 40.

The control unit 11 integrally controls the robot 1. The control unit 11 includes a CPU (Central Processing Unit) and realizes various processes as the control unit 11 by the CPU executing a program stored in the storage unit 12. That is, the program includes codes for causing the CPU included in the control unit 11 to execute the various processes as the control unit 11.

The storage unit 12 stores the above program and various other information items used by the control unit 11. The storage unit 12 includes at least one storage apparatus that can store the above program and the various other information items. At least one of, for example, a memory, a hard disk and the like may be arbitrarily used as the storage apparatus.

In order to transmit the information output from the control unit 11 to the operating terminal 9, the communication unit 13 converts the information output from the control unit 11 into radio signals and transmits the radio signals to the operating terminal 9. The communication unit 13 converts the radio signals received from the operating terminal 9 into electrical signals so that the radio signals will be information that can be processed by the control unit 11 and outputs the electrical signals to the control unit 11.

The actuators 21*a* and 21*b* drive the wheels 22*a* and 22*b*, respectively, of the robot 1. The actuator 21*a* is driven by control from the control unit 11 and rotates the wheel 22*a*. The actuator 21*b* is driven by control from the control unit 11 and rotates the wheel 22*b*.

The wheels 22*a* and 22*b* correspond to the above-mentioned wheels that are mounted on the lower part of the moving carriage 20. That is, the control unit 11 controls the actuators 21*a* and 21*b* to rotate the wheels 22*a* and 22*b*, respectively, to thereby move the robot 1.

The actuators 31*a* and 31*b* drive the arm 30 of the robot 1. Each of the actuators 31*a* and 31*b* is provided as a joint of the arm 30. Note that although an example in which the arm 30 includes two joints with the actuators 31*a* and 31*b* will be explained below, the number of the joints of the arm 30 is not limited to this.

Each of the angle sensors 32a and 32b is a sensor for detecting the angle of each joint of the arm 30. The angle sensor 32a is mounted on the actuator 31a and detects an angle of the actuator 31a. The angle sensor 32a outputs an angle signal indicating the detected angle to the control unit 11. The angle sensor 32b is mounted on the actuator 31b and detects an angle of the actuator 31b. The angle sensor 32b outputs an angle signal indicating the detected angle to the control unit 11. Then, the control unit 11 can recognize a state of the arm 30 based on the angles indicated by the angle signals output respectively from the angle sensors 32a and 32b.

The actuator 41 drives the head 40 of the robot 1. The actuator 41 can move the head 40 vertically and horizontally, for example, as an actuator having multiple degrees of freedom (a predetermined degree of freedom that is two degrees of freedom or greater). Further, a plurality of the actuators 41 for driving the head 40 may be included to realize driving of the head 40 with the multiple degrees of freedom. Alternatively, only one actuator having one degree of freedom may be included as the actuator 41, so that the head 40 can be operated vertically or horizontally.

Figure 3:
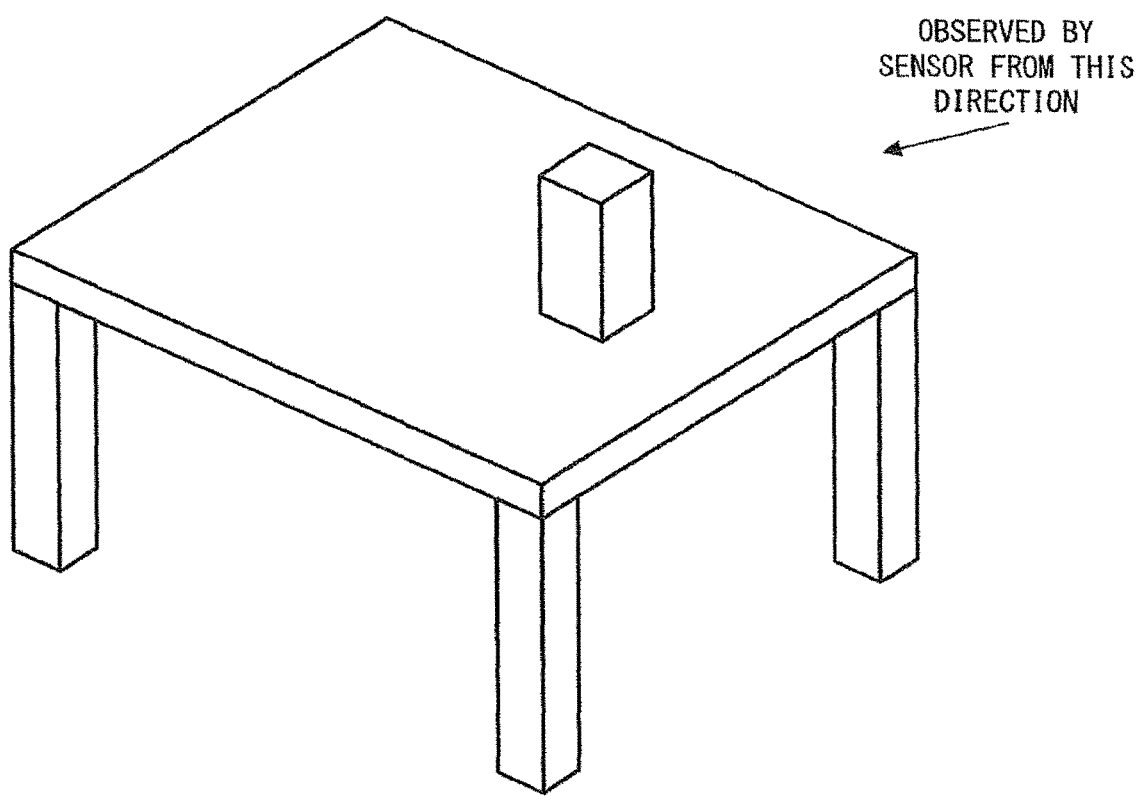
FIG. 3 is a drawing showing an example of an environment observed by the robot according to the first exemplary embodiment.

Next, an environment observation method by the robot 1 according to the first exemplary embodiment will be explained by referring to FIGS. 3 to 5. Firstly, the environment observation method by the robot 1 according to the first exemplary embodiment will be explained by referring to FIG. 3. FIG. 3 is a drawing showing an example of an environment observed by the robot 1 according to the first exemplary embodiment.

As shown in FIG. 3, an example in which the robot 1 observes the environment where a quadrangular prism object is placed on a table will be explained. In this environment, as shown in FIG. 3, suppose that the robot 1 has observed the environment using the sensor 50 from above in a front oblique direction of a side of the table.

The robot 1 divides a space around the robot 1, which is the observed environment, and categorizes regions into the following three regions.

A prohibited region: A region in which an obstacle has been observed

An unobserved region: An indefinite region that has not been observed as to whether or not there is an obstacle therein A free region: A region in which no obstacle has been observed To be more specific, as shown in FIG. 4, in the space around the robot 1, the control unit 11 determines a region that has been observed by the sensor 50 and an obstacle has been detected therein as being the prohibited region. The control unit 11 determines, for example, a region within a range of a predetermined distance from a position where the obstacle has been detected in a depth direction with respect to the sensor 50 as being the prohibited region. By doing so, for example, a certain range from a front surface (a lateral surface of the sensor 50 side) and a top surface of the quadrangular prism object and a top plate and legs of a desk on the front surface side are determined to be the prohibited region.

Figure 4:
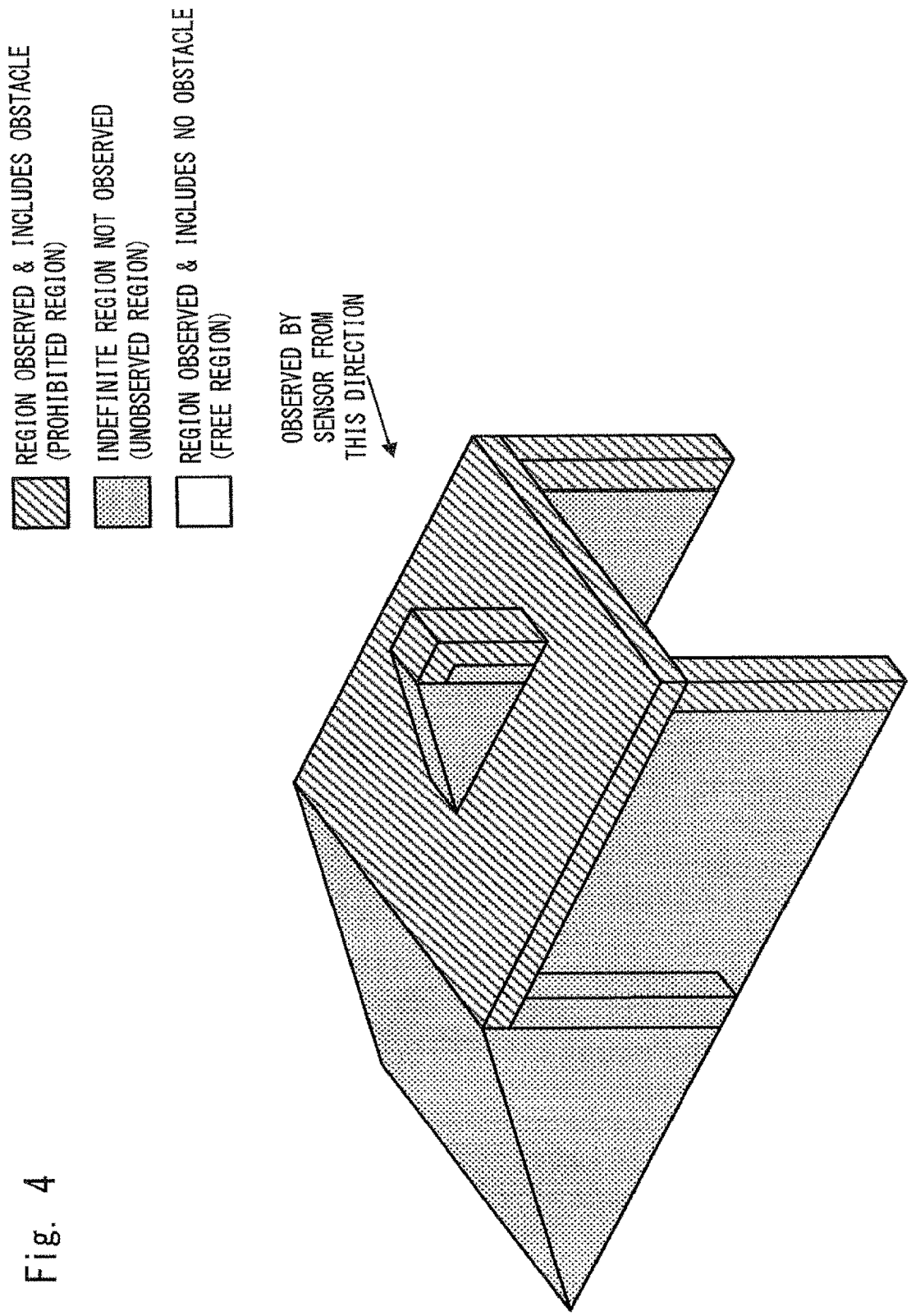
FIG. 4 is a drawing showing a result of an observation of the environment shown in FIG. 3 by the robot.
Figure 5:
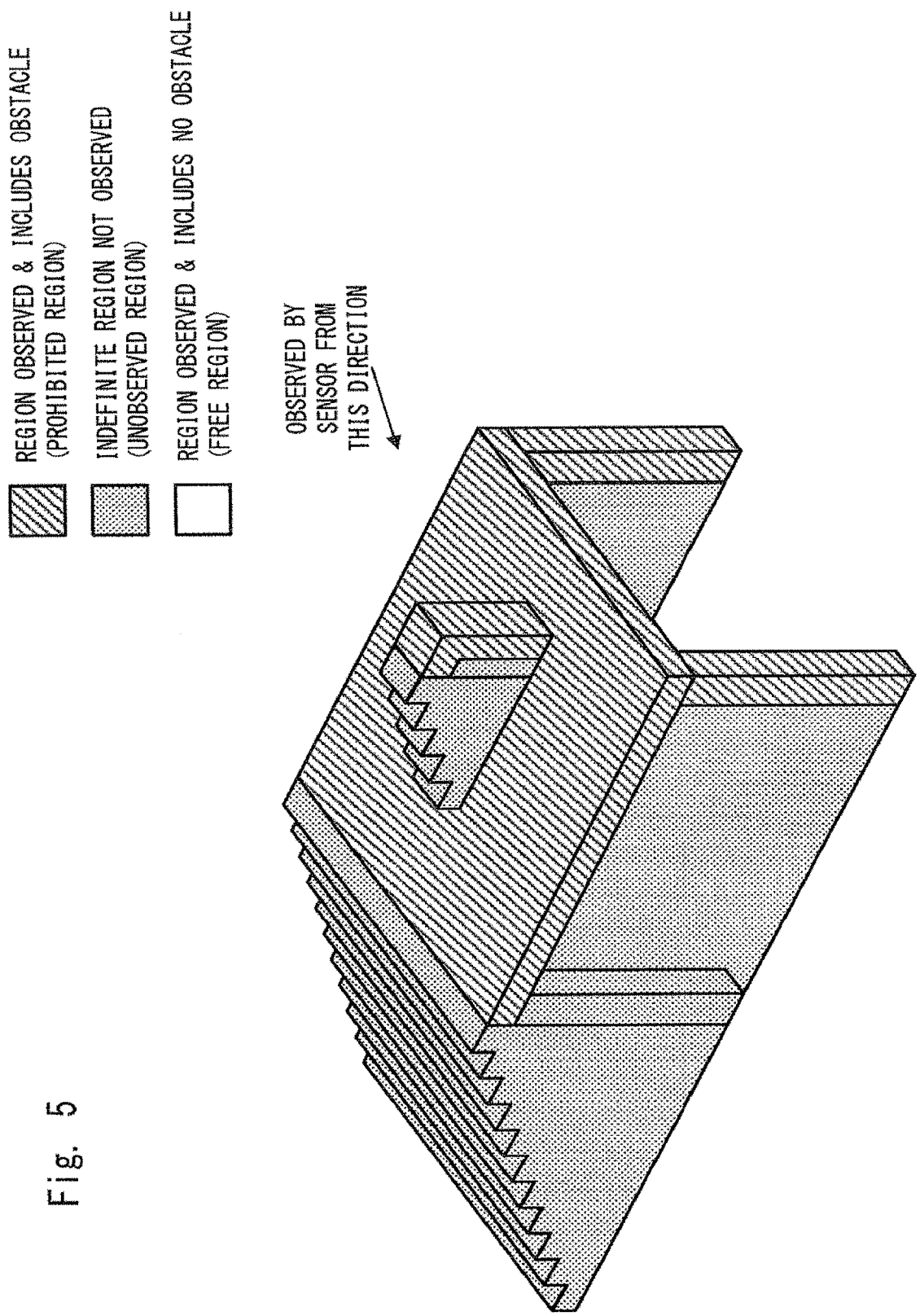
FIG. 5 is a drawing showing information that is the result of the observation of the environment shown in FIG. 3 by the robot.

Additionally, as shown in FIG. 4, in the space around the robot 1, the control unit 11 determines a region not observed by the sensor 50 as being the unobserved region. Accordingly, the region not observed by the sensor 50 includes, for example, a region located farther in the depth direction than the prohibited region with respect to the sensor 50. Then, for example, a region located behind the quadrangular prism and the top plate and the legs on the front surface side of the desk (including the legs located opposite to the front surface) with respect to the sensor 50 is determined as being the unobserved region. Note that a result of the determination is retained for the regions that have been determined as being the prohibited region or the free region in the past observation.

Moreover, as shown in FIG. 4, in the space around the robot 1, the control unit 11 determines a region that has been observed by the sensor 50 and no obstacle has been detected therein as being the free region. The control unit 11 determines, for example, a space up to a position where an obstacle is detected as being the free region. In this way, a space from the robot 1 (the sensor 50) to the quadrangular prism, the desk, and other objects (wall, floor and the like) is determined as being the free region.

The control unit 11 stores information indicating one of the regions of the above three categories to which each of the regions that have been obtained by dividing the space around the robot 1 belongs in the storage unit 12 as space information to thereby manage a result of the observation of the space around the robot 1. In a more simplified way, for example, a three-dimensional array may be prepared in the storage unit 12 as the space information. In this case, respective elements of the three-dimensional array correspond to the regions that have been obtained by dividing the space around the robot 1 in a reticular pattern. Then, as shown in FIG. 5, when the control unit 11 determines that a certain region among a plurality of regions obtained by dividing the space around the robot 1 belongs to any one of the regions of the three categories, the control unit 11 stores a value indicating the category, which is the result of the determination, in the element of the three-dimensional array corresponding to the region. An arbitrary value may be previously set for this value as long as the value can uniquely identify one of the prohibited region, the unobserved region, and the free region.

Therefore, when the robot 1 attempts to enter a certain region among the plurality of regions obtained by dividing the space around the robot 1, the control unit 11 refers to the value corresponding to the certain region of the space information to thereby recognize to which one of the prohibited region, the unobserved region, and the free region the certain region belongs.

Figure 6A:
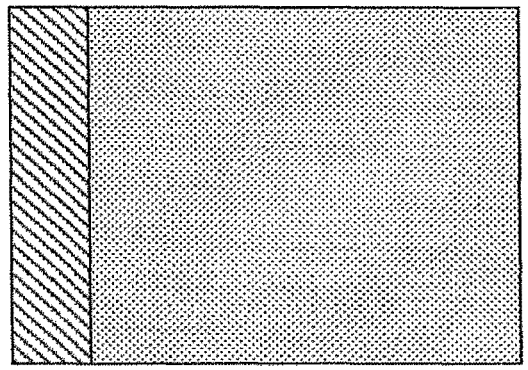
FIG. 6A is a drawing showing an example in which the robot operates in a free region.
Figure 6A:
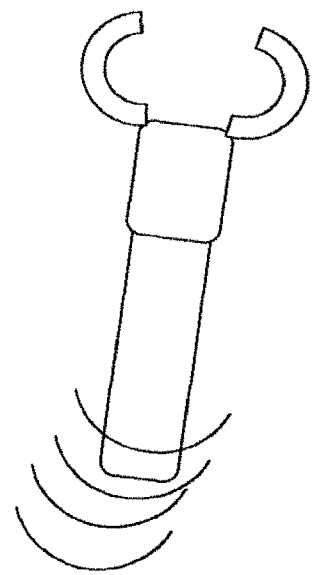
Figure 6B:
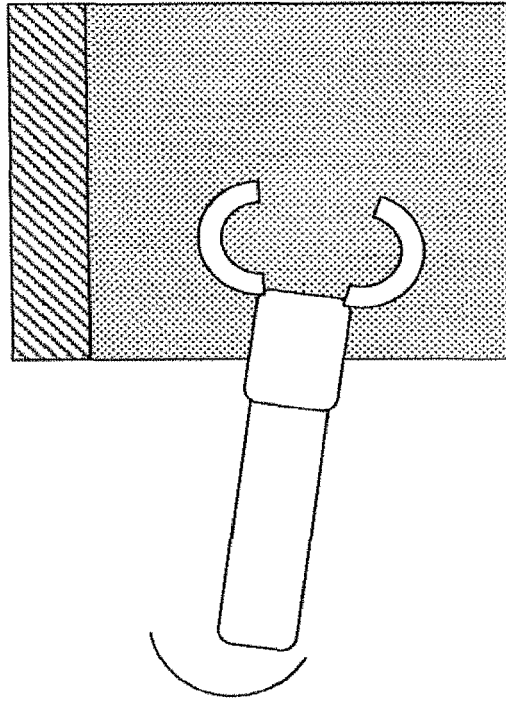
FIG. 6B is a drawing showing an example in which the robot operates in an unobserved region.
Figure 6C:
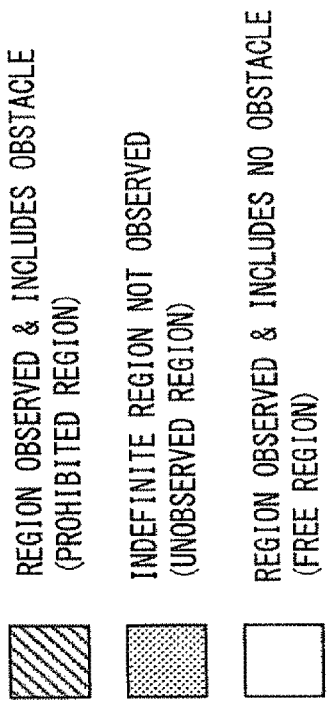
FIG. 6C is a drawing showing an example in which the robot operates in a prohibited region.
Figure 6C:
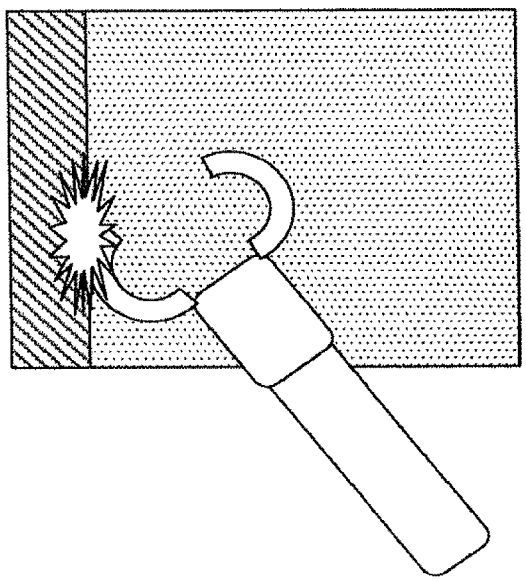

Next, an operation method of the robot 1 according to the first exemplary embodiment will be explained with reference to FIGS. 6A to 6C and 7A to 7C. FIG. 6A is a drawing showing an operation of the robot 1 according to the first exemplary embodiment in the free region. FIG. 6B is a drawing showing an operation of the robot 1 according to the first exemplary embodiment in the unobserved region. FIG. 6C is a drawing showing an operation of the robot 1 according to the first exemplary embodiment in the prohibited region.

As shown in FIG. 6A, when it is determined that the entire arm 30 operates in the free region, the control unit 11 operates the arm 30 at a high speed. As shown in FIG. 6B, when it is determined that at least a part of the arm 30 operates in the unobserved region (may include the case in which the arm 30 comes into contact with the unobserved region), the control unit 11 operates the arm 30 at a speed lower than the speed at which the arm 30 operates in the free region. As shown in FIG. 6C, when it is determined that at least a part of the arm 30 operates in the prohibited region (may include the case in which the arm 30 comes into contact with the prohibited region), the control unit 11 completely stops the arm 30.

As has been explained, when the robot 1 is operated, the speed of the arm 30 is changed according to whether or not the region in which the arm 30 operates has already been observed, and the speed of the arm 30 is reduced in the unobserved region in which the arm 30 may come into contact with an object that has not been recognized by the robot 1. Then, if by any chance the arm 30 comes into contact with the object, an influence of the contact of the arm 30 on the object can be reduced. As the speed will not be reduced more than necessary in the free region, the robot 1 can be operated at a high speed.

Figure 7A:
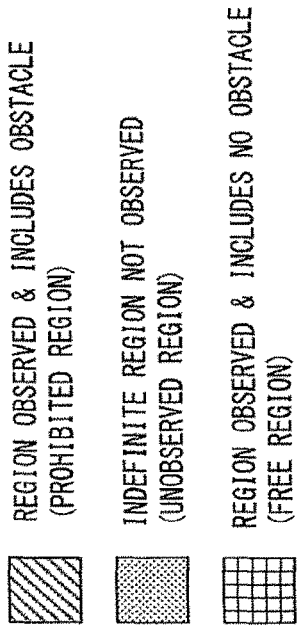
FIG. 7A is a drawing showing an example in which the robot operates in a free region.
Figure 7A:
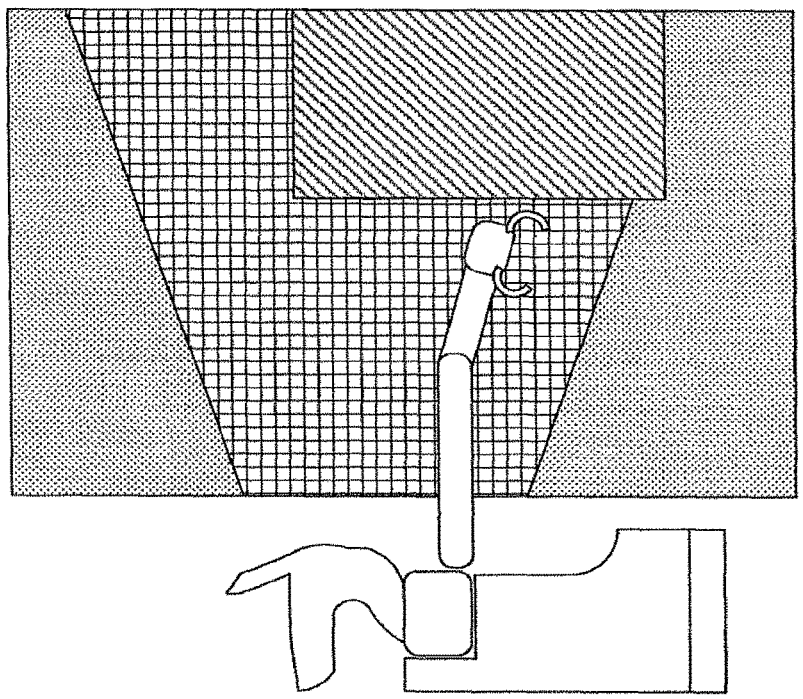
Figure 7B:
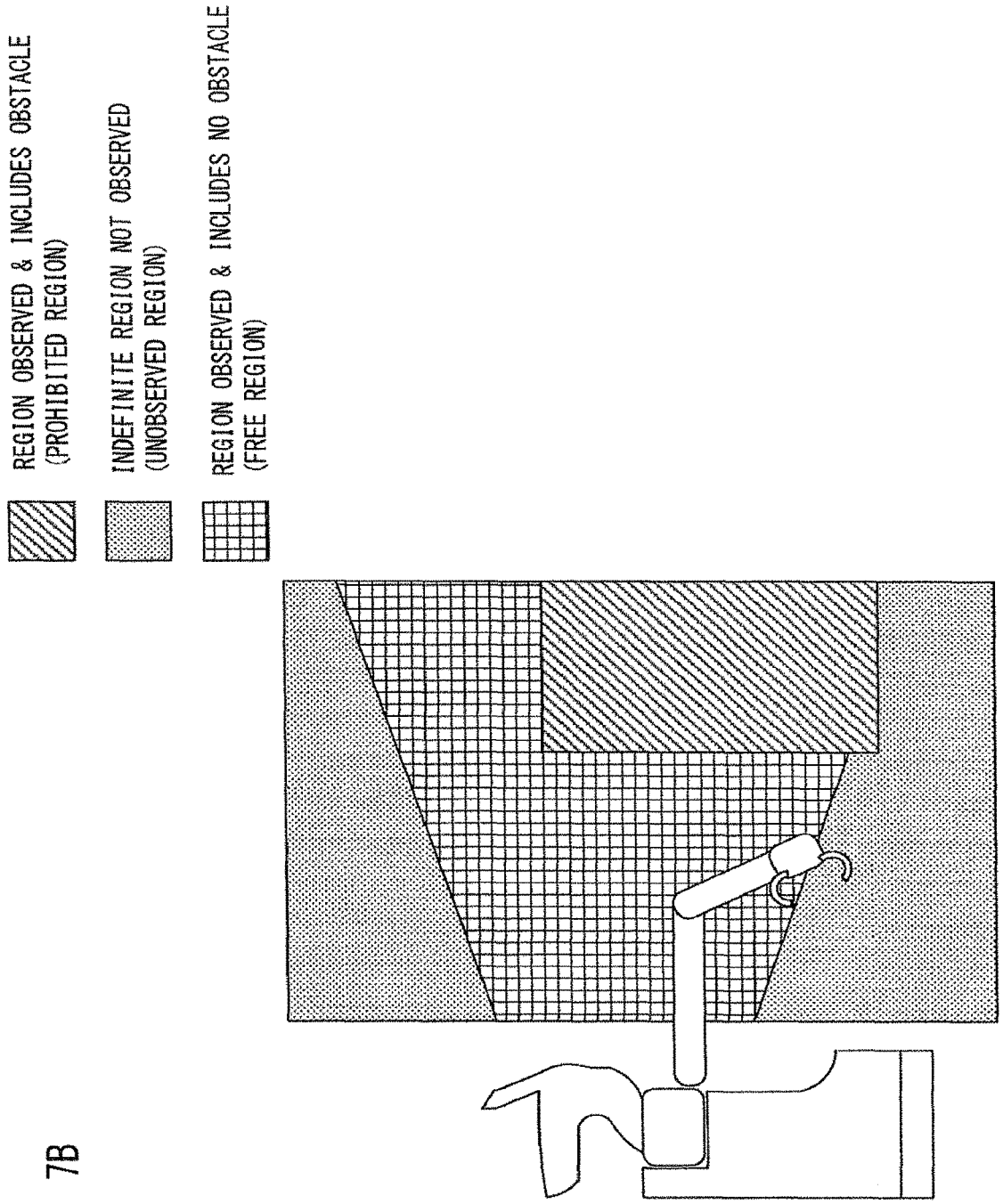
FIG. 7B is a drawing showing an example in which the robot operates in an unobserved region.
Figure 7C:
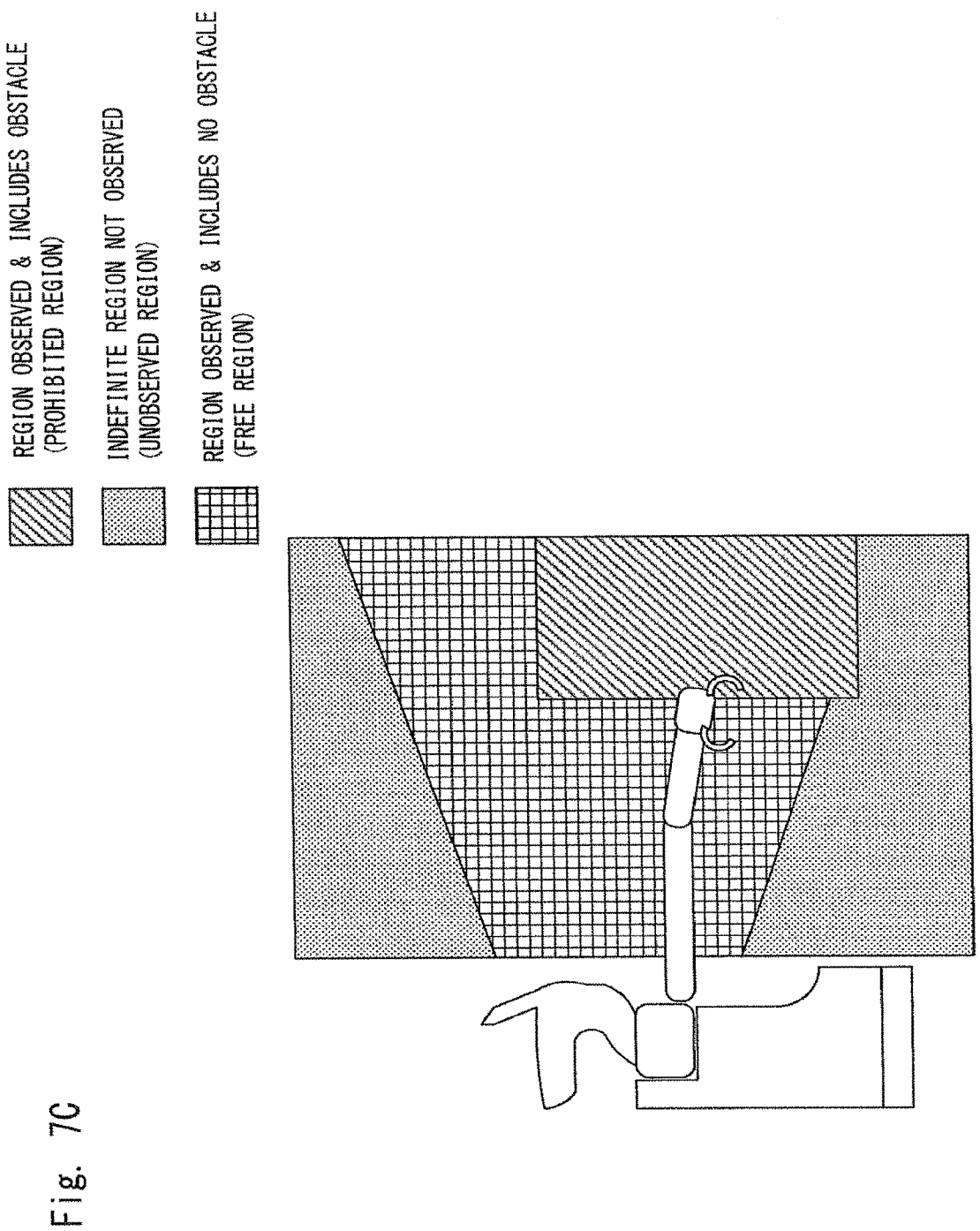
FIG. 7C is a drawing showing an example in which the robot operates in a prohibited region.

The robot 1 changes the operation according to a volume of the arm 30 overlapping the unobserved region. FIG. 7A is a drawing showing an operation of the robot 1 according to the first exemplary embodiment in the free region. FIG. 7B is a drawing showing an operation of the robot 1 according to the first exemplary embodiment in the unobserved region. FIG. 7C is a drawing showing an operation of the robot 1 according to the first exemplary embodiment in the prohibited region.

As shown in FIG. 7A, when the entire arm 30 is included in the free region, the arm 30 is operated at a high speed. As shown in FIG. 7B, when at least a part of the arm 30 is included in the unobserved region (may include the case in which the arm 30 comes into contact with the unobserved region), the speed is reduced according to how much of the arm has entered the unobserved region. As shown in FIG. 7C, when at least a part of the arm is included in the prohibited region (may include the case in which the arm 30 comes into contact with the prohibited region), the arm 30 is stopped.

Figure 8:
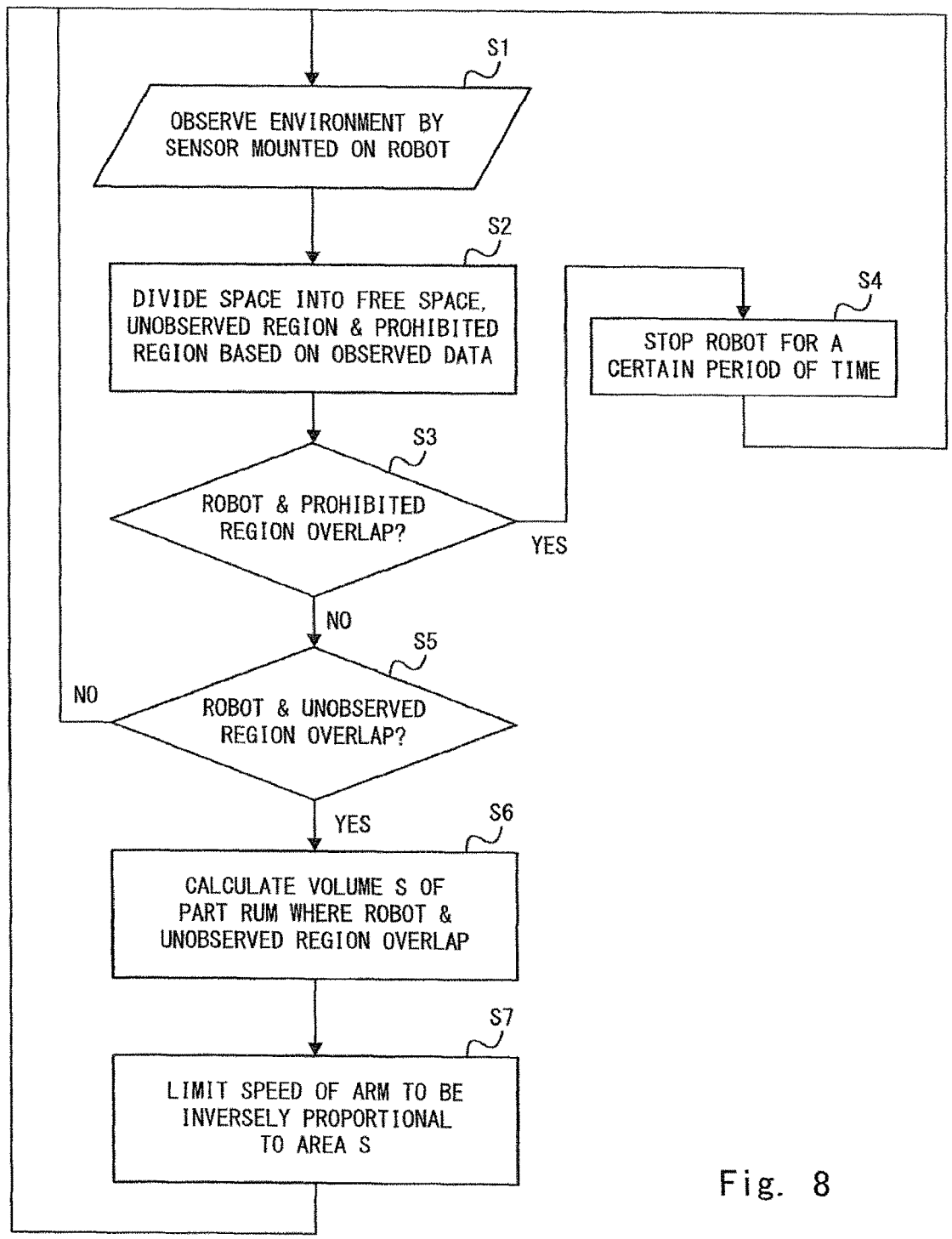
FIG. 8 is a flowchart showing an operation of the robot according to the first exemplary embodiment.

Next, the operation of the robot 1 according to the first exemplary embodiment will be explained by referring to FIG. 8. FIG. 8 is a flowchart showing the operation of the robot 1 according to the first exemplary embodiment.

The robot 1 observes the environment around the robot 1 using the sensor 50 mounted on the robot 1 (S1). To be more specific, the sensor 50 observes the environment around the robot 1, generates environmental information indicating the observed environment, and outputs it to the control unit 11. When the sensor 50 is, for example, a three-dimensional distance sensor, the sensor 50 outputs information indicating a distance from the sensor 50 to an obstacle in respective directions to the control unit 11 as the environmental information.

The robot 1 divides the space around the robot 1 into the free region, the unobserved region, and the prohibited region according to the observed data (S2). To be more specific, the control unit 11 determines a region in which an obstacle is present (the prohibited region) and a region in which no obstacle is present (the free region) based on the environment indicated by the environmental information that has been output from the sensor 50. The control unit 11 updates the space information stored in the storage unit 12 according to a result of the above determination. Each region indicated by the space information may, for example, indicate the unobserved region as an initial value. Then, the control unit 11 changes the space information in such a way that the region determined as being the prohibited region is indicated as being the prohibited region and the region determined as being the free region is indicated as being the free region.

The robot 1 determines as to whether or not the robot 1 overlaps the prohibited region (S3). Specifically, the control unit 11 calculates a region in which the arm 30 is included in the space around the robot 1. For example, information indicating a shape of each component of the arm 30 such as links (parts between the joints of the arm 30), the grip 60 and the like is previously stored in the storage unit 12. The control unit 11 calculates the region in which the arm 30 is included in the space around the robot 1 according to the position of the robot 1, the shape of each component of the arm 30 indicated by the information stored in the storage unit 12, and the joint angles indicated by the angle signals that have been output respectively from the angle sensors 32a and 32b of the arm 30. When the region that has been calculated as being the region in which the arm 30 is included is determined as being the prohibited region based on the space information, the control unit 11 determines that the robot 1 overlaps the prohibited region.

The position (a current position) of the robot 1 can be identified by any method. The control unit 11 may, for example, identify the current position of the robot 1 by a relative position with respect to an obstacle around the robot 1 based on the environmental information. Moreover, the angle sensor may be included in each of the actuators 21a and 21b, total rotation angles (the number of times the wheels have rotated) from a predetermined reference position of the robot 1 may be calculated based on the angles of the actuators 21a and 21b that have been detected by the angle sensors, and the current position of the robot 1 may be identified based on the calculated total rotation angles and the size of the wheels.

When it is determined that the robot 1 overlaps the prohibited region (S3: YES), the robot 1 stops the operation for a certain period of time (S4). More specifically, the control unit 11 calculates command values for the actuators 31a and 31b, respectively, so as to stop the operation of the arm 30. In other words, the control unit 11 calculates the command values for the actuators 31a and 31b so that angular speeds of the actuators 31a and 31b will become zero. The control unit 11 outputs the calculated command values to the actuators 31a and 31b, respectively. Each of the actuators 31a and 31b stops rotation of the joints of the arm 30 according to the command values output from the control unit 11. That is, the operation of the arm 30 is stopped.

After execution of the step S4 has ended, the process returns to the step S1. That is, the robot 1 stops the operation for a certain period of time and then executes the process from the step S1. For example, when an obstacle in the prohibited region that has been determined to overlap the robot 1 is a moving object (e.g., a person, an animal or the like), after a certain period of time, the region may no longer be the prohibited region, and the robot 1 may become operable. Therefore, such processes enable an observation of the latest state of the space around the robot 1 and the robot 1 so that the operation can be resumed when the robot 1 becomes operable.

When it is determined that the robot 1 overlaps the prohibited region (S3: NO), the robot 1 determines as to whether or not the robot 1 overlaps the unobserved region (S5). More specifically, the control unit 11 calculates a region in which the arm 30 is included in the space around the robot 1. As in the step S3, the control unit 11 calculates a region in which the arm 30 is included in the space around the robot 1. Then, when the region calculated as being the region in which the arm 30 is included is determined as being the unobserved region based on the space information, the control unit 11 determines that the robot 1 overlaps the unobserved region. Note that the region calculated in the step S3 may be used as the region in which the arm 30 is included as it is.

Figure 9:
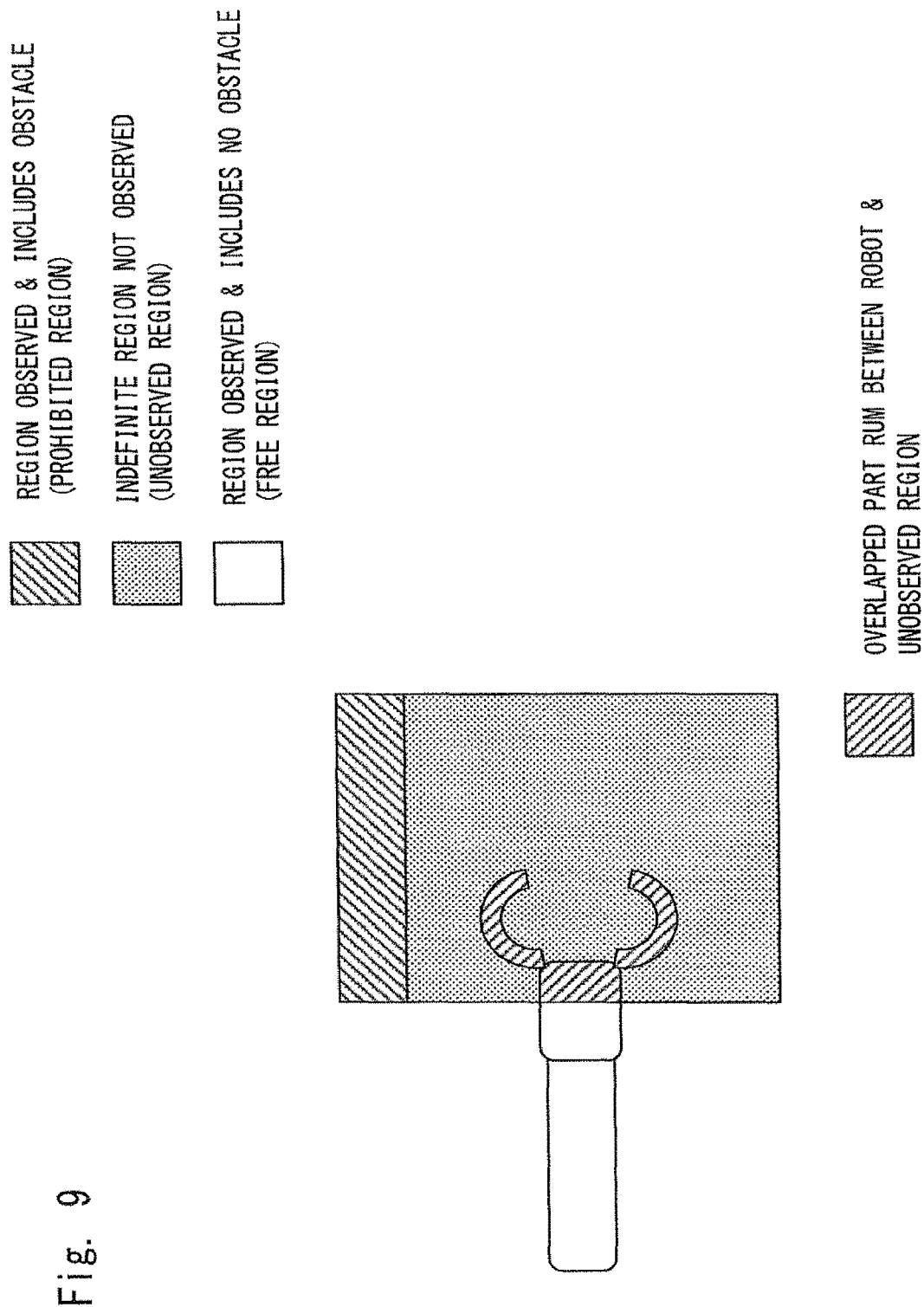
FIG. 9 is a drawing showing an overlapped part between an arm and the unobserved region.

When it is determined that the robot 1 overlaps the unobserved region (S5: YES), the robot 1 calculates a volume S of a part RUM where the robot 1 overlaps the unobserved region (S6). To be more specific, the control unit 11 calculates the volume S of the part RUM, which is shown in FIG. 9, where the arm 30 overlaps the unobserved region based on the position of the robot 1, the shape of each component of the arm 30 indicated by the information stored in the storage unit 12, the joint angles indicated by the angle signals output respectively from the angle sensors 32a and 32b of the arm 30, and the unobserved region indicated by the space information stored in the storage unit 12.

The robot 1 limits the speed of the arm 30 so that it will be inversely proportional to the calculated volume S (S7). More specifically, the control unit 11 calculates the command values for the actuators 31a and 31b, respectively, so that the greater the calculated volume S, the lower the speed of arm 30 will become. In other words, the control unit 11 calculates the command values for the actuators 31a and 31b, respectively, so that the greater the calculated volume S, the lower the angular speed of the actuators 31a and 31b will become. The control unit 11 outputs the calculated command values to the actuators 31a and 31b, respectively. Each of the actuators 31a and 31b rotates the joint of the arm 30 at a speed according to the command value output from the control unit 11. Then, the arm 30 operates at a speed that is inversely proportional to the volume S. After execution of the step S6 has ended, the process returns to the step S1.

When it is determined that the robot 1 does not overlap the unobserved region (S5: NO), the process returns to the step S1. That is, the robot 1 does not limit the speed of the arm 30. More specifically, the control unit 11 calculates the command values for the actuators 31a and 31b so that they will not limit the moving speed of the arm 30. In other words, the control unit 11 calculates the command values for the actuators 31a and 31b so that they will not limit the angular speeds of the actuators 31a and 31b, respectively. The control unit 11 outputs the calculated command values to the actuators 31a and 31b, respectively. Each of the actuators 31a and 31b rotates the joint of the arm 30 at a speed according to the command value output from the control unit 11. Then, the arm 30 operates at an unlimited speed. That is, this speed is higher than the speed of the arm 30 when it is determined that the robot 1 overlaps the unobserved region.

Although the first exemplary embodiment has been explained so far, the present invention is not limited to the above contents, and various modifications can be made thereto without departing from the scope of the invention. For example, although it has been explained that the greater the volume S of the part RUM, which is shown in FIG. 9, where the arm 30 overlaps the unobserved region, the greater a degree of a reduction in the speed of the arm 30 (S6 and S7), it is not limited to this as long as the speed is limited when the arm 30 overlaps the unobserved region. For example, when the arm 30 does not overlap the unobserved region, a first speed may be set for the speed of the arm 30, while when the arm 30 overlaps the unobserved region, a second speed that is lower than the first speed may be set for the speed of the arm 30. That is, the speed of the arm 30 may be a constant speed regardless of the volume S of the part RUM where the arm 30 overlaps the unobserved region. Alternatively, when the volume S of the part RUM where the arm 30 overlaps the unobserved region exceeds a predetermined threshold, the second speed may be set for the speed of the arm 30. In a further alternative, it may be configured in such a way that the shorter the distance between the arm 30 and the prohibited region, the greater the degree of the reduction in the speed of the arm 30 will become.

In the above explanation, although when the arm 30 overlaps the prohibited region, the operation of the arm 30 is stopped (S4), it is not limited to a complete stop (the speed is set to zero) as long as the speed of the arm 30 can be reduced so that the speed of the arm 30 will become lower than the speed of the arm 30 when the arm 30 overlaps the unobserved region. That is, when it is determined that the arm 30 overlaps the prohibited region, the control unit 11 may control the actuators 31a and 31b to operate the arm 30 at a speed lower than the speed of the arm 30 when the arm 30 overlaps the unobserved region.

Further, in the above explanation, although the operation of the arm 30 is stopped when the arm 30 overlaps the prohibited region (S4), another operation may be performed instead of stopping the operation of the arm 30 or another operation may be executed in addition to stopping the operation of the arm 30. For example, when it is determined that the arm 30 overlaps the prohibited region, the control unit 11 may control the actuators 31a and 31b to return the arm 30 to a state before it is determined that the arm 30 overlaps the prohibited region instead of stopping the operation of the arm 30. Alternatively, as another operation, a sounding apparatus such as a speaker may be included in the robot 1, and the sounding apparatus may output an alarm sound to notify a user that the arm 30 overlaps the prohibited region. As still another operation, a light emitting apparatus such as an LED may be included in the robot 1, and the light emitting apparatus may emit light to notify the user that the robot 1 overlaps the prohibited region. As one more operation, a display apparatus such as a liquid crystal display, an organic EL display or the like may be included in the robot 1, and an alarm image may be displayed on the display apparatus to notify the user that the arm 30 overlaps the prohibited region.

In the above explanation, although the environment is observed again after the operation of the arm 30 is stopped for a certain period of time, and when the arm 30 no longer overlaps the prohibited region, the arm 30 is operated again (S4, S1, and S3: NO), it is not limited to this. For example, the control unit 11 may control the movement of the arm 30 so that it remains stopped. Alternatively, when the control unit 11 receives an instruction for resuming the operation from the user via the operating terminal 9, the control unit 11 may operate the arm 30 again. To be more specific, when the operating terminal 9 accepts an input that is an instruction for resuming the operation from the user by an input apparatus such as a touch panel, the operating terminal 9 generates radio signals for giving an instruction to resume the operation and transmits the radio signals to the robot 1. The communication unit 13 of the robot 1 converts the radio signals received from the operating terminal 9 into electrical signals and outputs the electrical signals to the control unit 11 as information for giving the instruction to resume the operation. The control unit 11 operates the arm 30 again according to the output of the information for giving the instruction to resume the operation from the communication unit 13.

As has been explained so far, the robot 1 according to the first exemplary embodiment includes the sensor 50 (environmental information obtaining means) that obtains the environmental information on the environment around the robot 1 and the control unit 11 (control means) that reduces a driving force of the robot 1 when the robot 1 is operated in the unobserved region, in which region the environmental information thereof has not been obtained by the environmental information obtaining means.

Therefore, even when the robot 1 comes into contact with an obstacle, there will be no large impact on the obstacle and the robot 1 will not receive a large impact from the obstacle. Accordingly, safety can be improved even when the robot 1 is operated in the unobserved region.

Further, the robot 1 according to the first exemplary embodiment includes the storage unit 12 (storage means) that stores the space information (region information) indicating to which one of the unobserved region, the prohibited region, and the free region each region around the robot 1 belongs. Then, the control unit 11 determines which one of the unobserved region, the prohibited region, and the free region the regions around the robot 1 belong to based on the environmental information obtained by the sensor 50, updates the space information according to the result of the determination, and also determines which one of the unobserved region, the prohibited region, and the free region the region in which the robot 1 is operated belongs to based on the space information.

Therefore, even when an obstacle is not currently within a range that can be observed by the sensor 50, the robot 1 can avoid the obstacle that has been observed by the sensor 50 in the past. It is thus possible to further improve the safety when the robot 1 operates.

Regarding the robot 1 according to the first exemplary embodiment, the control unit 11 reduces the driving force of the robot 1 in such a way that the greater the volume of the robot 1 included in the unobserved region, the greater the degree of the reduction in the driving force of the robot 1.

Therefore, when a major part of the robot 1 enters the unobserved region, the higher the probability of the robot 1 coming into contact with the obstacle, the greater the reduction in the driving force of the robot 1. It is thus possible to further improve the safety when the robot 1 operates.

Second Exemplary Embodiment

Next, a robot 2 according to a second exemplary embodiment will be explained. In the above first exemplary embodiment, the speed of the arm 30 itself is changed according to how much of the arm 30 overlaps the unobserved region. However, instead of changing the speed of the arm 30 itself, by changing a gain of a feedback loop of the arm 30, an impact force when the arm 30 of the robot 2 hits an obstacle in the unobserved region can be reduced. Such a method will be explained in the second exemplary embodiment.

As the configuration of the robot 2 according to the second exemplary embodiment is the same as that of the robot 1 according to the first exemplary embodiment explained with reference to FIGS. 1 and 2, an explanation of the configuration of the robot 2 will be omitted. However, some operations of the control unit 11 are different from those explained in the first exemplary embodiment in order to realize the control by the above method.

In the second exemplary embodiment, the control unit 11 performs feedback control on the arm 30 of the robot 2. With the above configuration, as the feedback control, the control unit 11 performs the feedback control (e.g., position control or speed control) based on the angles detected by the angle sensors 32a and 32b, respectively. However, the types of the feedback control are not limited to this. The control unit 11 may perform any type of the feedback control such as position control, speed control, torque control or the like.

For example, when the position control is performed, the control unit 11 generates command value for each of the actuators 31a and 31b based on error between the angle of each of the actuators 31a and 31b indicated by the angle signals output from the angle sensors 32a and 32b and target angle of each of the actuators 31a and 31b, and gains, and outputs the command values to the actuators 31a and 31b, respectively.

When the speed control is performed, the control unit 11 calculates angular speeds of the actuators 31a and 31b by differentiating the angles of the actuators 31a and 31b indicated by the angle signals output from the angle sensors 32a and 32b, respectively. The control unit 11 generates the command value for each of the actuators 31a and 31b based on the error between the calculated angular speed of each of the actuators 31a and 31b and the target angular speed of each of the actuators 31a and 31b, and the gains, and outputs the command values to the actuators 31a and 31b, respectively. Note that the robot 2 may include an angular speed sensor (a tachogenerator) that detects the angular speeds of the actuators 31a and 31b from the actuators 31a and 31b, respectively, and outputs angular speed signals indicating the detected angular speeds to the control unit 11. Then, the control unit 11 may use the angular speeds of the actuators 31a and 31b indicated by the angle signals output from the angular speed sensor in place of the angular speeds of the actuators 31a and 31b that are calculated from the angles.

Note that when the torque control is performed, the robot 2 includes a torque sensor that detects torque of the actuators 31a and 31b from the actuators 31a and 31b, respectively, and outputs torque signals indicating the detected torque to the control unit 11. Then, the control unit 11 generates the command value for each of the actuators 31a and 31b based on error between the torque of each of the actuators 31a and 31b indicated by the torque signals output from the torque sensor and target torque of each of the actuators 31a and 31b, and gains, and outputs the command values to the actuators 31a and 31b, respectively.

Note that as a known technique can be used for the specific method of calculating the command values in the feedback control, detailed descriptions will be omitted.

Figure 10A:
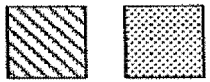
FIG. 10A is a drawing showing an example in which the robot operates in the free region.
Figure 10A:
Figure 10A:
Figure 10A:
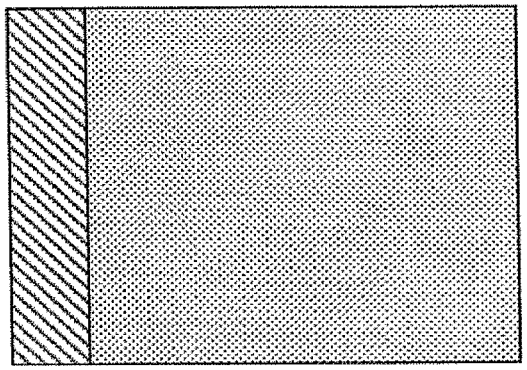
Figure 10A:
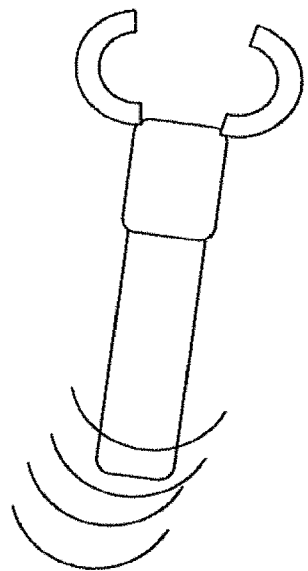
Figure 10B:
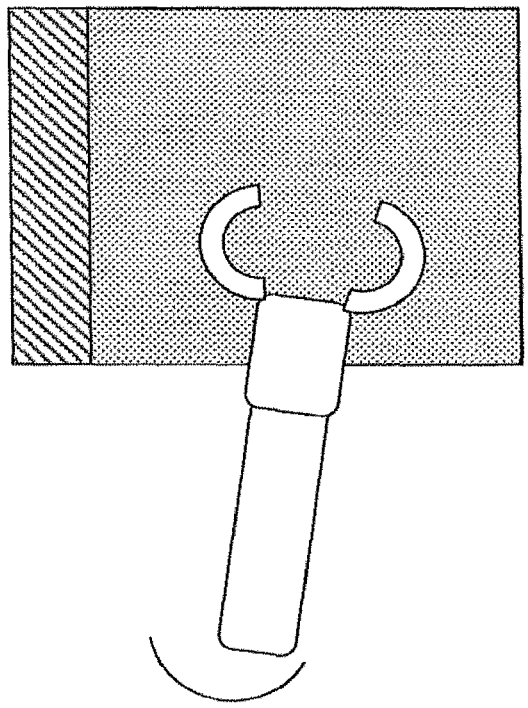
FIG. 10B is a drawing showing an example in which the robot operates in the unobserved region.
Figure 10C:
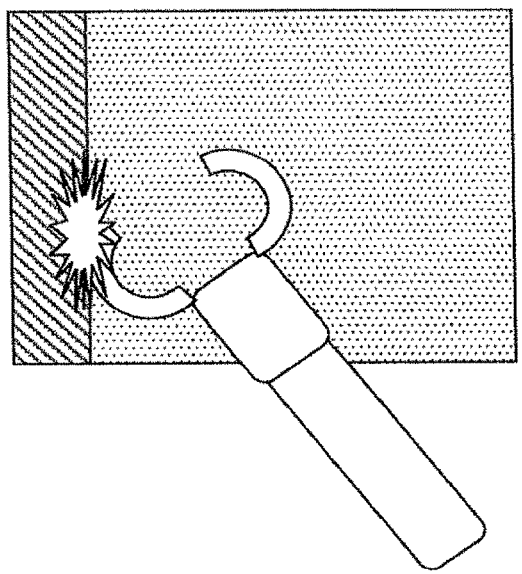
FIG. 10C is a drawing showing an example in which the robot operates in the prohibited region.

Next, an operation method of the robot 2 according to the second exemplary embodiment will be explained with reference to FIGS. 10A to 10C. FIG. 10A is a drawing showing an operation of the robot 2 according to the second exemplary embodiment in the free region. FIG. 10B is a drawing showing an operation of the robot 2 according to the second exemplary embodiment in the unobserved region. FIG. 10C is a drawing showing an operation of the robot 2 according to the second exemplary embodiment in the prohibited region.

As shown in FIG. 10A, when it is determined that the entire arm 30 operates in the free region, the control unit 11 performs the feedback control on the arm 30 with a high gain. As shown in FIG. 10B, when at least a part of the arm 30 is included in the unobserved region (may include the case in which the arm 30 comes into contact with the unobserved region), the control unit 11 performs the feedback control on the arm 30 with a gain lower than the gain when the arm 30 operates in the free region. As shown in FIG. 10C, when at least a part of the arm 30 is included in the prohibited region (may include the case in which the arm 30 comes into contact with the prohibited region), the control unit 11 performs the feedback control on the arm 30 with a gain lower than the gain when the arm 30 operates in the unobserved region.

As has been explained, when the robot 2 is operated, the gain of the arm 30 is reduced in the unobserved region in which the arm 30 may come into contact with an unrecognized object by changing the gain of the feedback control on the arm 30 according to whether or not the region in which the arm 30 operates has already been observed. Then, if by any chance the arm 30 comes into contact with the object, an influence on the object can be reduced. As the gain will not be reduced more than necessary in the free region, the robot 2 can be operated highly accurately.

Figure 11:
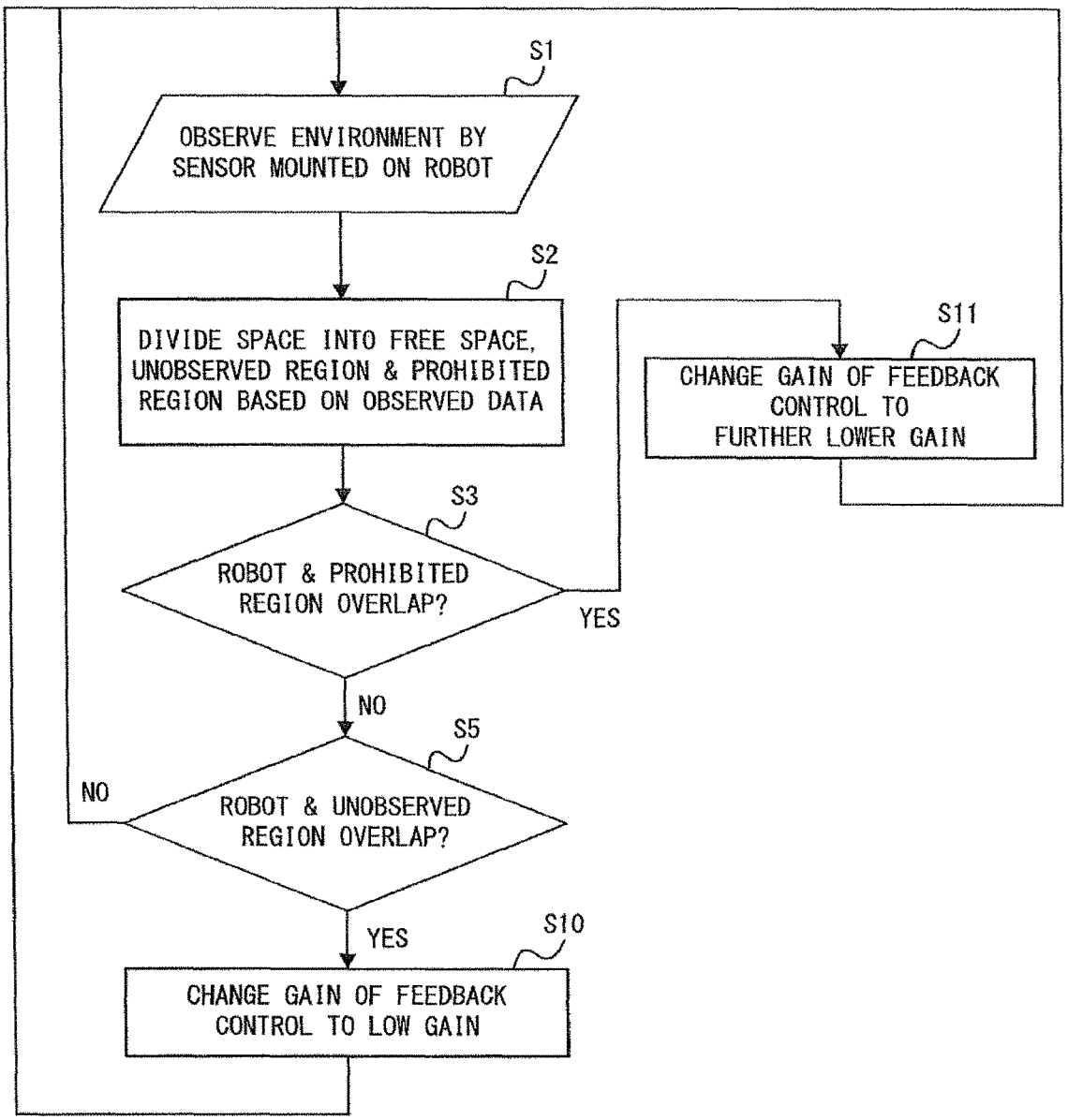
FIG. 11 is a flowchart showing an operation of a robot according to a second exemplary embodiment.

Next, an operation of the robot 2 according to the second exemplary embodiment will be explained by referring to FIG. 11. FIG. 11 is a flowchart showing the operation of the robot 2 according to the second exemplary embodiment. As the steps S to S3 and S5 are similar to the processes explained in the first exemplary embodiment by referring to FIG. 8, the same processes are denoted by the same reference numerals, and repeated descriptions will be omitted.

When it is determined that the robot 2 overlaps the unobserved region (S5: YES), the control unit 11 changes the gain of the feedback loop to a lower gain (S10).

When it is determined that the robot 2 overlaps the prohibited region (S3: YES), the control unit 11 changes the gain of the feedback loop to a lower gain (S11). This gain (a second gain) is lower than the gain (a first gain) that has been set in the step S10.

When it is determined that the robot 2 does not overlap the unobserved region (S5: NO), the process returns to the step S1. That is, the control unit 11 does not change the gain of the feedback loop to a lower gain. Accordingly, when the step S10 or S11 is executed, and a low gain is set for the gain of the feedback loop, the control unit 11 changes the gain of the feedback loop to a high gain. This gain (a third gain) is greater than the gain (the first gain) that has been set in the step S10.

Although the second exemplary embodiment has been explained so far, the present invention is not limited to the above contents, and various modifications can be made thereto without departing from the scope of the invention. For example, when it is determined that the robot 2 overlaps the unobserved region and that the robot 2 overlaps the prohibited region, and a low gain is set, it may be configured in such a way that the greater the volume S of the part RUM where the robot 2 overlaps the unobserved region or the prohibited region, the greater the degree of the reduction in the gain.

Moreover, although in the above explanation, when the robot 2 overlaps the prohibited region, the gain of the feedback control on the arm 30 is changed to a low gain, instead of the operation of the arm 30 may be stopped. As described in the first exemplary embodiment, another operation may be executed instead of changing the gain or another operation may be executed in addition to changing the gain.

As described above, in the second exemplary embodiment, the gain of the feedback control of the robot 2 is reduced to thereby reduce a driving force of the robot 2. That is, this control is not limited to only the speed and gain, and various parameters regarding the control of the robots 1 and 2 may be controlled as long as the driving force of the robots 1 and 2 and the force applied on an obstacle when the robots 1 and 2 come into contact with the obstacle can be reduced.

Third Exemplary Embodiment

Next, a robot 3 according to a third exemplary embodiment will be explained. Although in the above first exemplary embodiment, a case in which the speed of the arm 30 of the robot 1 is controlled has been explained, a moving speed of the robot 1 (the robot body 10) may be controlled similarly. By doing so, it is possible to reduce the impact force when the robot 1 (the robot body 10) hits an obstacle in the unobserved region. Such a method will be explained in the third exemplary embodiment.

As the configuration of the robot 3 according to the third exemplary embodiment is the same as that of the robot 1 according to the first exemplary embodiment explained with reference to FIGS. 1 and 2, an explanation of the configuration of the robot 3 will be omitted. However, some operations of the control unit 11 are different from those explained in the first exemplary embodiment in order to realize the control by the above method. Note that the robot 1 according to the third exemplary embodiment may be a carriage type robot not including the arm 30.

In the third exemplary embodiment, the control unit 11 changes the moving speed of the robot 1 (the robot body 10) according to which one of the free region, the unobserved region, and the prohibited region the robot body 10 is operating therein.

Figure 12:
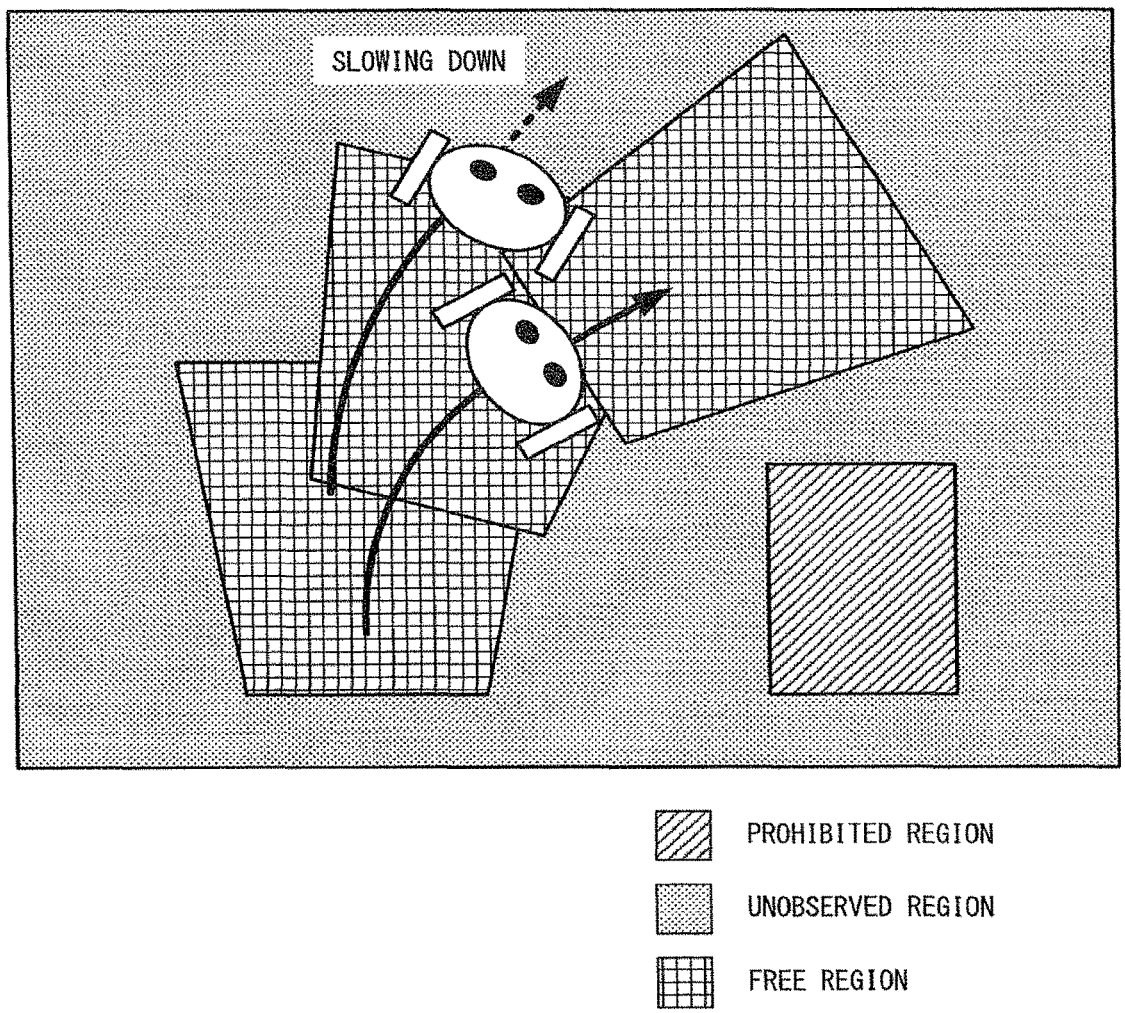
FIG. 12 is a drawing showing an example in which a robot according to a third exemplary embodiment operates in each region.

Next, an environment recognition method and an operation method of the robot 3 according to the third exemplary embodiment will be explained by referring to FIG. 12. FIG. 12 is a drawing showing an example in which the robot 3 according to the third exemplary embodiment operates in each region.

Although the robot 1 according to the first exemplary embodiment captures the environment around the robot 1 in a form of a three-dimensional space and categorizes the regions into each region, the robot 3 according to the third exemplary embodiment captures the environment around the robot 1 in a form of a two-dimensional space (two-dimensional surface) and categorizes the regions into each region. To be more specific, the control unit 11 categorizes a road surface (the two-dimensional space) around the robot 1 into any one of the prohibited region, the unobserved region, and the free region.

The control unit 11 determines a region on the road surface around the robot 1 that is observed by the sensor 50 and an obstacle is disposed directly on the road surface as being the prohibited region. The control unit 11 further determines a region on the road surface around the robot 1 that has not been observed by the sensor 50 as being the unobserved region. Furthermore, the control unit 11 determines a region on the road surface around the robot 1 that has been observed by the sensor 50 and no obstacle has been detected directly on the road surface as being the free region.

The control unit 11 stores the information indicating the regions of the three categories to which the regions obtained by dividing the space around the robot 3 belong in the storage unit 12 as the space information so as to manage the result of the observation of the space around the robot 1. In a more simplified way, for example, a two-dimensional array may be prepared in the storage unit 12 as the space information. In this case, each element of the two-dimensional array corresponds to each of the regions obtained by dividing the space (the road surface) around the robot 3. When the control unit 11 determines a certain region obtained by dividing the space around the robot 3 belongs to one of the regions of the three categories, the control unit 11 stores a value indicating the determined category in the element corresponding to the region in the two-dimensional array. An arbitrary value may be previously set for this value as long as the value can uniquely identify one of the prohibited region, the unobserved region, and the free region.

Then, as shown in FIG. 12, when it is determined that the entire robot body 10 operates in the free region (moves in the free region) in the vertical direction, the control unit 11 moves the robot 3 (the robot body 10) at a high speed. When it is determined that at least a part of the robot body 10 moves in the unobserved region (moves in the unobserved region) (may include the case in which the robot body 10 comes into contact with the unobserved region) in the vertical direction, the control unit 11 moves the robot 3 at a speed lower than the speed of the robot 3 when the robot body 10 operates in the free region. When it is determined that at least a part of the robot body 10 operates in the prohibited region (moves in the prohibited region) (may include the case when the robot body 10 comes into contact with the prohibited region) in the vertical direction, the control unit 11 completely stops the movement of the robot body 10.

In this way, by changing the speed of the robot body 10 according to whether or not the region in which the robot body 10 operates has already been observed when the robot 3 is operated, the speed of the robot body 10 is reduced in the unobserved region in which an object not recognized by the robot 3 may come into contact with the robot body 10. Then, if by any chance the robot body 10 comes into contact with the object, an influence on the object can be reduced. As the speed will not be reduced more than necessary in the free region, the robot 3 can move at a high speed.

Figure 13:
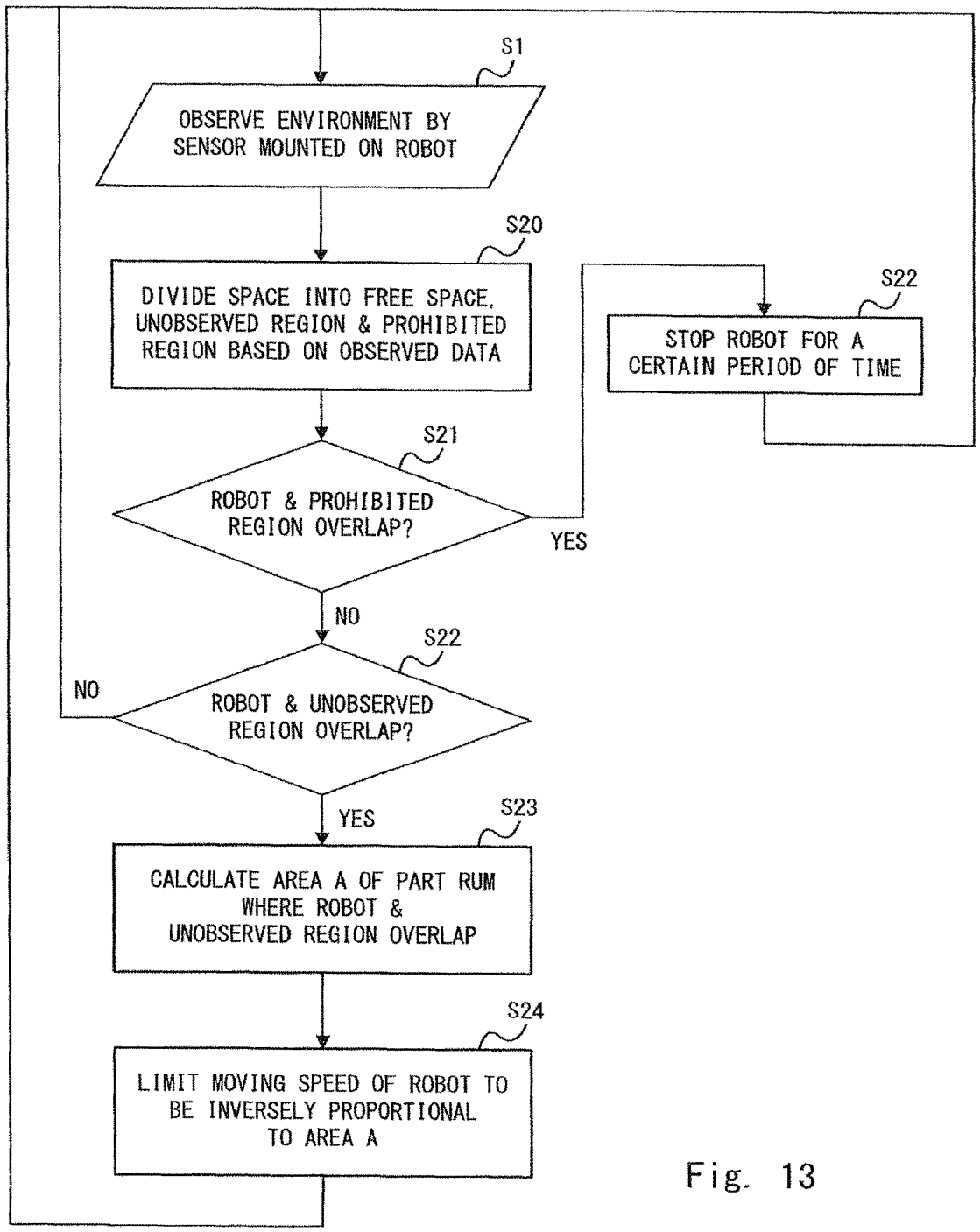
FIG. 13 is a flowchart showing an operation of the robot according to the third exemplary embodiment.

Next, an operation of the robot 3 according to the third exemplary embodiment will be explained by referring to FIG. 13. FIG. 13 is a flowchart showing the operation of the robot 3 according to the third exemplary embodiment. As the step S1 is similar to the process explained in the first exemplary embodiment by referring to FIG. 8, the same processes are denoted by the same reference numerals, and repeated descriptions will be omitted.

The robot 3 divides the space around the robot 3 into the free region, the unobserved region, and the prohibited region from the observed data (S20). In the third exemplary embodiment, as described above, as the processes are same as those in the first exemplary embodiment except that the space information stored in the storage unit 12 is the information of the two-dimensional space, detailed descriptions will be omitted.

The robot 3 determines as to whether or not the robot 3 overlaps the prohibited region (S21). To be more specific, the control unit 11 calculates a region in which the robot body 10 is included in the space around the robot 3. For example, the information indicating a shape of the robot body 10 is previously stored in the storage unit 12. The control unit 11 calculates a region in which the robot body 10 is included when the robot body 10 is viewed from the vertical direction in the space around the robot 3 based on the shape of the robot body 10 indicated by the information stored in the storage unit 12 and the position of the robot 3. Then, when it is determined that the region calculated as being the region in which the robot body 10 is included is the prohibited region based on the space information, the control unit 11 determines that the robot 3 overlaps the prohibited region.

When it is determined that the robot 3 overlaps the prohibited region (S21: YES), the robot 3 stops the operation for a certain period of time (S22). More specifically, the control unit 11 calculates the command values for the actuators 21*a* and 21*b* so as to stop the movement of the robot 3. In other words, the control unit 11 calculates the command values for the actuators 21*a* and 21*b* so that angular speeds of the actuators 21*a* and 21*b* will become zero. The control unit 11 then outputs the calculated command values to the actuators 21*a* and 21*b*. The actuators 21*a* and 21*b* stop rotation of the wheels 22*a* and 22*b*, respectively, according to the command values output from the control unit 11. That is, the movement of the robot 3 (the robot body 10) is stopped.

After execution of the step S22 has ended, the process returns to the step S1. That is, the robot 3 stops the operation for a certain period of time and then executes the process from the step S1. For example, when an obstacle in the prohibited region that has been determined to overlap the robot 3 is a moving object (e.g., a person, an animal or the like), after a certain period of time, the region may no longer be the prohibited region, and the robot 3 may be operable. Such processes enable an observation of the latest state of the space around the robot 3 so that the robot 3 can resume the operation when the robot 3 becomes operable.

When it is determined that the robot 3 does not overlap the prohibited region (S21: NO), the robot 3 determines as to whether or not the robot 3 overlaps the unobserved region (S22). More specifically, the control unit 11 calculates a region in which the robot body 10 is included in the space around the robot 3. In a manner similar to the above step S21, the control unit 11 calculates the region in which the robot body 10 is included in the space around the robot 3 when the robot body 10 is viewed from the vertical direction. Then, when it is determined that the region calculated as being the region in which the robot body 10 is included is the unobserved region based on the space information, the control unit 11 determines that the robot 3 overlaps the unobserved region.

Figure 14:
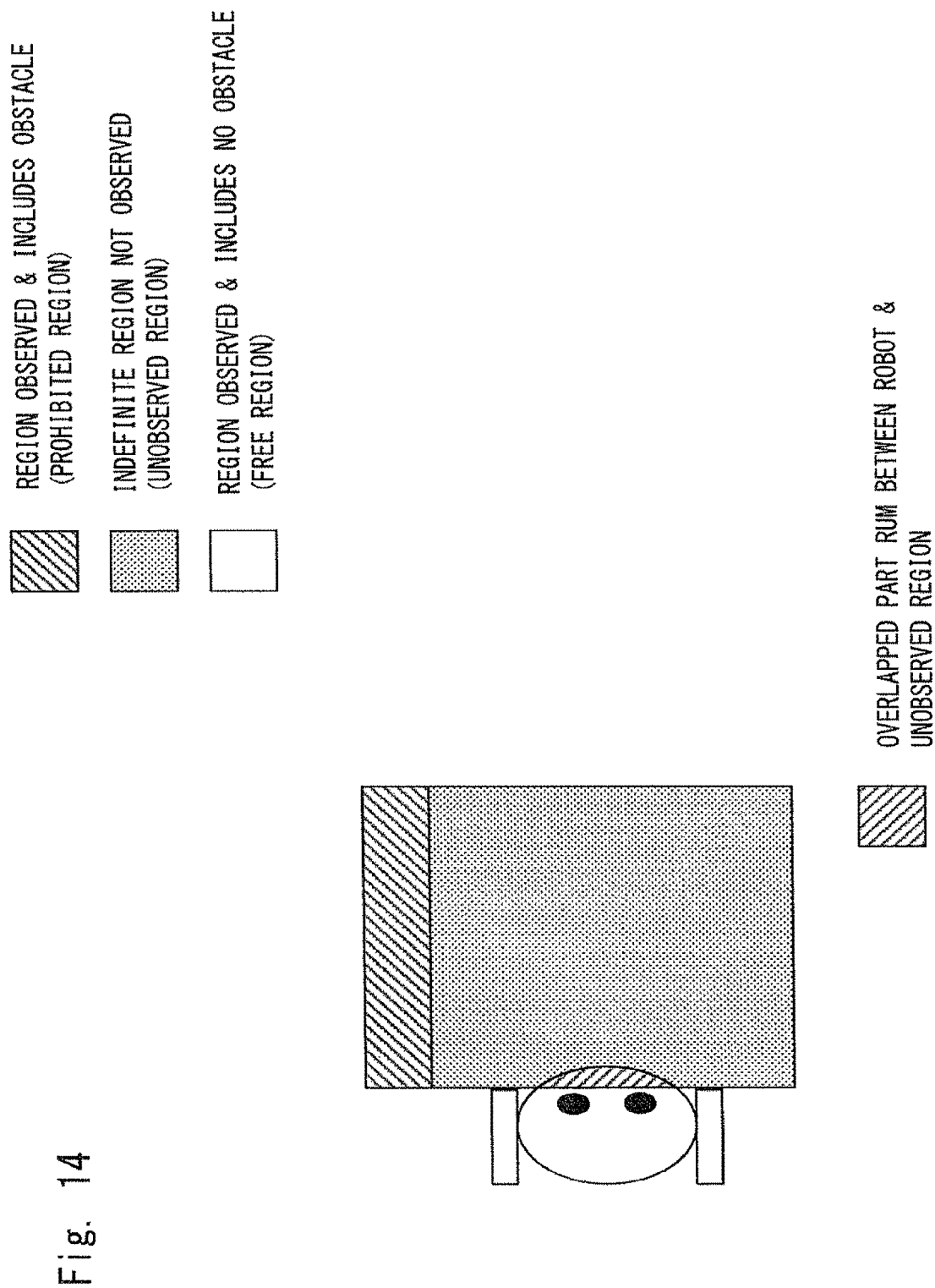
FIG. 14 is a drawing showing an overlapped part between a robot body and the unobserved region.

When it is determined that the robot 3 overlaps the unobserved region (S22: YES), the robot 3 calculates an area A of a part RUM where the robot 3 overlaps the unobserved region (S23). To be more specific, the control unit 11 calculates the area A of the part RUM, which is shown in FIG. 14, where the robot body 10 overlaps the unobserved region in the vertical direction based on the position of the robot 3, the shape of the robot body 10 indicated by the information stored in the storage unit 12, and the unobserved region indicated by the space information stored in the storage unit 12.

The robot 3 limits a moving speed of the robot 3 so that it will be inversely proportional to the calculated area A (S24). To be more specific, the control unit 11 calculates the command values for the actuators 21*a* and 21*b* so that the moving speed of the robot 3 (the robot body 10) will become smaller as the calculated area A becomes larger. In other words, the control unit 11 calculates the command values for the actuators 21*a* and 21*b* so that angular speeds of the actuators 21*a* and 21*b* will become smaller as the calculated area A becomes larger. The control unit 11 outputs the calculated command values to the actuators 21*a* and 21*b*, respectively. The actuators 21*a* and 21*b* rotate the wheels 22*a* and 22*b*, respectively, at the lower part of the robot body 10 at speeds according to the command values output from the control unit 11. Then, the robot 1 moves at a speed inversely proportional to the area A. After execution of the step S24 has ended, the process returns to the step S1.

When it is determined that the robot 3 does not overlap the unobserved region (S22: NO), the process returns to the step S1. That is, the robot 3 does not limit the moving speed of the robot 3. More specifically, the control unit 11 calculates the command values for the actuators 21*a* and 21*b* so that they will not limit the moving speed of the robot 3. In other words, the control unit 11 calculates the command values for the actuators 21*a* and 21*b* so that they will not limit the angular speeds of the actuators 21*a* and 21*b*, respectively. The control unit 11 outputs the calculated command values to the actuators 21*a* and 21*b*, respectively. The actuators 21*a* and 21b rotate the wheels 22a and 22b, respectively, at the lower part of the robot body 10 at speeds according to the command values output from the control unit 11. Then, the robot 3 moves at an unlimited speed. That is, this speed is higher than the speed of the robot 3 when it is determined that the robot 3 overlaps the unobserved region.

Although the third exemplary embodiment has been explained so far, the present invention is not limited to the above contents, and various modifications can be made thereto without departing from the scope of the invention. For example, although it has been explained that the larger the area A of the part RUM, which is shown in FIG. 14, where the robot body 10 overlaps the unobserved region (S23 and S24), the greater the degree of the reduction in the moving speed of the robot 3 (the robot body 10), it is not limited to this as long as the moving speed is limited when the robot body 10 overlaps the unobserved region. For example, when the robot body 10 does not overlap the unobserved region, a first speed may be set for the moving speed of the robot 3, while when the robot body 10 overlaps the unobserved region, a second speed that is lower than the first speed may be set for the moving speed of the robot 3. That is, the moving speed of the robot 3 may be a constant speed regardless of the area A of the part RUM where the robot body 10 overlaps the unobserved region. Alternatively, when the area A of the part RUM where the robot body 10 overlaps the unobserved region exceeds a predetermined threshold, the second speed may be set for the moving speed of the robot 3. Further alternatively, it may be configured in such a way that the shorter the distance between the robot 3 (the robot body 10) and the prohibited region, the greater the degree of the reduction in the moving speed of the robot 3.

In the above explanation, although when the robot body 10 overlaps the prohibited region, the movement of the robot 3 is stopped (S22), it is not limited to a complete stop (the moving speed is set to zero) as long as the moving speed of the robot 3 can be reduced so that it will be lower than the moving speed of the robot 3 when the robot body 10 overlaps the unobserved region. That is, when it is determined that the robot body 10 overlaps the prohibited region, the control unit 11 may control the actuators 21a and 21b to move the robot 3 at a speed lower than the speed of the robot 3 when the robot 3 overlaps the unobserved region.

Moreover, although in the above explanation, when the robot body 10 overlaps the prohibited region, the movement of the robot 3 is stopped (S22), another operation may be performed instead of stopping the movement of the robot 3 or another operation may be executed in addition to stopping the movement of the robot 3. For example, when it is determined that the robot body 10 overlaps the prohibited region, the control unit 11 may control the actuators 21a and 21b to return the position of the robot 3 to a state before determining that the robot body 10 overlaps the prohibited region instead of stopping the movement of the robot 3. Alternatively, as described in the first exemplary embodiment, a sounding apparatus, a light emitting apparatus, or a display apparatus may be used to notify the user that the robot body 10 overlaps the prohibited region.

In the above explanation, although after the operation of the robot 3 is stopped for a certain period of time, the environment is observed again, and when the robot body 10 no longer overlaps the prohibited region, the robot 3 is moved again (S22, S1, and S21: NO), it is not limited to this. For example, the control unit 11 may control the movement of the robot 3 so that it remains stopped. Alternatively, when the control unit 11 receives an instruction for resuming the operation from the user via the operating terminal 9, the control unit 11 may move the robot 3 again. To be more specific, when the operating terminal 9 accepts an input that is an instruction for resuming the operation from the user by an input apparatus such as a touch panel, the operating terminal 9 generates radio signals for giving an instruction to resume the operation and transmits the radio signals to the robot 3. The communication unit 13 of the robot 3 converts the radio signals received from the operating terminal 9 into electrical signals and outputs the electrical signals to the control unit 11 as information for giving the instruction to resume the operation. The control unit 11 moves the robot 3 again according to the output of the information for giving the instruction to resume the operation from the communication unit 13.

In the above explanation, although the environment around the robot 3 has been captured in the form of the two-dimensional space and the regions are categorized into the respective regions, the environment around the robot 3 may be captured in the form of the three-dimensional space and the regions may be categorized into the respective regions as in the first and second exemplary embodiments. In this case, for example, also in the steps S23 and S24, the degree of the reduction in the moving speed of the robot 3 (the robot body 10) may be increased as the volume of the part RUM where the robot body 10 overlaps the unobserved region increases.

As has been explained so far, in the third exemplary embodiment, when the robot 3 is moved in the unobserved region, the driving force of the robot 3 for moving the robot 3 is reduced. Note that in the first and second exemplary embodiments, when the arm 30 included in the robots 1 and 2 is operated in the unobserved region, the driving force of the arm 30 included in the robots 1 and 2 is reduced.

That is, any part of the robot may be previously determined as being a part which will be evaluated as to whether or not it overlaps the unobserved region or the like and in which a driving force thereof is reduced according to a result of the evaluation as long as it is a part that may come into contact with an obstacle. Further, a part of the robot which will be evaluated as to whether or not it overlaps the unobserved region or the like may be the same as a part of the robot in which a driving force there is reduced according to the result of the determination or these parts may be different.

Fourth Exemplary Embodiment

Next, a robot 4 according to a fourth exemplary embodiment will be explained. Although in the third exemplary embodiment, the moving speed of the robot 4 (the robot body 10) is changed according how much of the robot body 10 overlaps the unobserved region, the gain of the feedback loop of the robot 4 may be changed instead of changing the moving speed of the robot 4 itself. That is, in the second exemplary embodiment, although the case in which the speed of the arm 30 of the robot 2 is controlled has been explained, the moving speed of the robot 4 (the robot body 10) may be controlled similarly. This reduces an impact force when the robot 4 (the robot body 10) hits an obstacle in the unobserved region. Such a method will be explained in the fourth exemplary embodiment.

Figure 15:
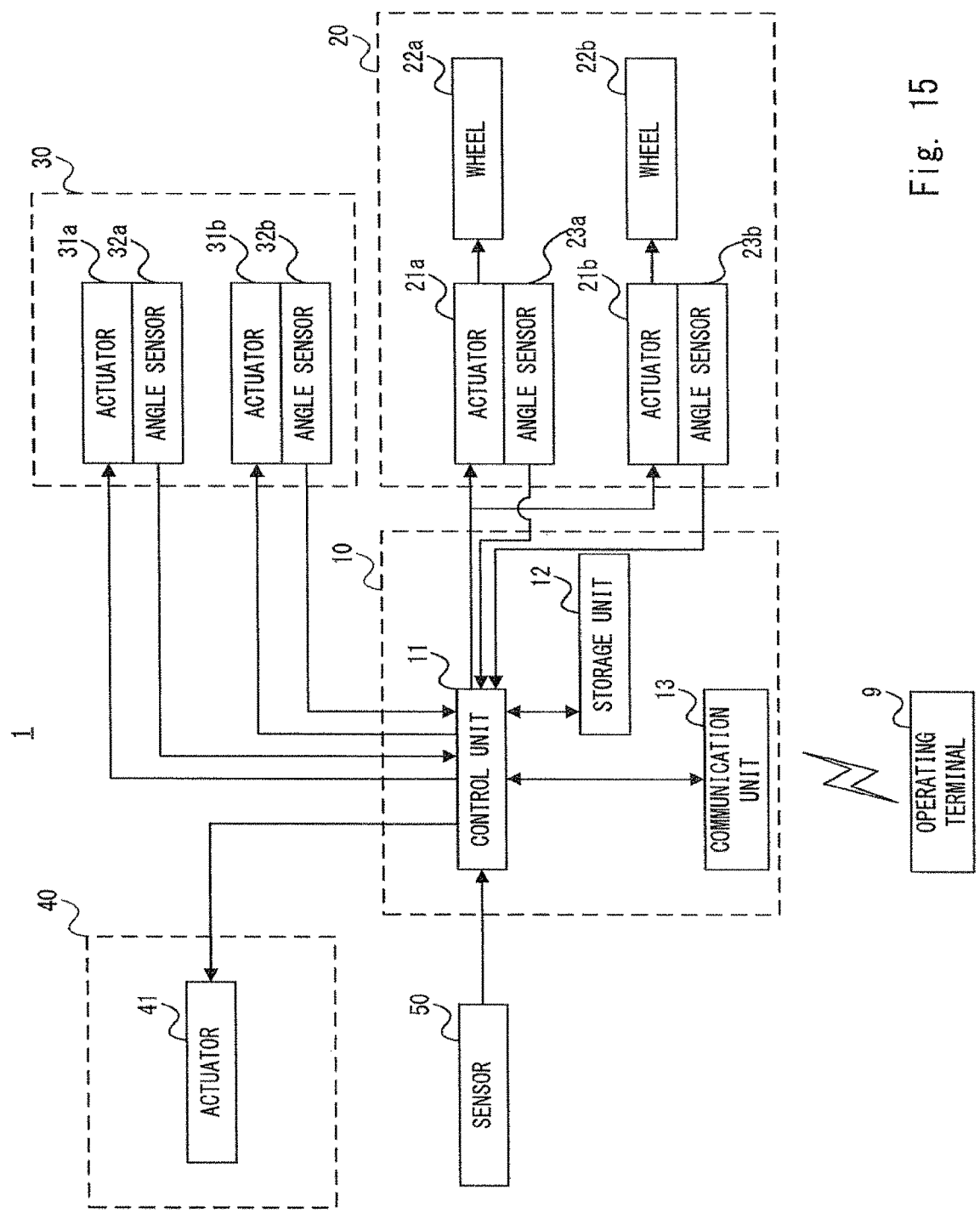
FIG. 15 is an internal configuration diagram of a robot according to a fourth exemplary embodiment.

As an external configuration of the robot 4 according to the fourth exemplary embodiment is the same as that of the robot 1 according to the first exemplary embodiment explained by referring to FIG. 1, descriptions of the external configuration of the robot 4 will be omitted. However, as shown in FIG. 15, as an internal configuration, the robot 4 according to the fourth exemplary embodiment further includes angle sensors 23a and 23b in addition to the configuration of the robot 1 according to the first exemplary embodiment. Some operations of the control unit 11 are different from those explained in the first exemplary embodiment in order to realize the control by the above method.

The angle sensors 23a and 23b are sensors that detect angles of the actuators 21a and 21b, respectively. The angle sensor 23a is mounted on the actuator 21a and detects an angle of the actuator 21a. The angle sensor 23a outputs an angle signal indicating the detected angle to the control unit 11. The angle sensor 23b is mounted on the actuator 21a and detects an angle of the actuator 21b. The angle sensor 33b outputs an angle signal indicating the detected angle to the control unit 11.

In the fourth exemplary embodiment, the control unit 11 performs the feedback control on the movement of the robot 4 (the robot body 10). Although in the above configuration, the control unit 11 performs the feedback control (e.g., the position control or speed control) based on the angles detected by the angle sensors 23a and 23b, it is not limited to this. The control unit 11 may perform any type of feedback control such as position control, speed control, torque control or the like.

For example, when the position control is performed, the control unit 11 generates command value for each of the actuators 21a and 21b based on error between the angle of each of the actuators 21a and 21b indicated by the angle signals output from the angle sensors 23a and 23b and target angle of each of the actuators 21a and 21b and gains and outputs the command values to the actuators 21a and 21b, respectively.

When the speed control is performed, the control unit 11 calculates angular speeds of the actuators 21a and 21b by differentiating the angles of the actuators 21a and 21b indicated by the angle signals output from the angle sensors 23a and 23b, respectively. The control unit 11 generates the command values for the actuators 21a and 21b based on the calculated angular speeds of the actuators 21a and 21b, the target angular speeds of the actuators 21a and 21b, and the gains, and outputs the command values to the actuators 21a and 21b, respectively. Note that the robot 4 may include an angular speed sensor (a tachogenerator) that detects the angular speeds of the actuators 21a and 21b from the actuators 21a and 21b, respectively, and outputs the angular speed signals indicating the detected angular signals to the control unit 11. Then, the control unit 11 may use the angular speeds of the actuators 21a and 21b indicated by the angle signals output from the angular speed sensor in place of the angular speeds of the actuators 21a and 21b that are calculated from the angles.

Note that when the torque control is performed, the robot 4 includes a torque sensor that detects torque of the actuators 21a and 21b from the actuators 21a and 21b, respectively, and outputs torque signals indicating the detected torque to the control unit 11. Then, the control unit 11 generates the command value for each of the actuators 21a and 21b based on error between the torque of each of the actuators 21a and 21b indicated by the torque signals output from the torque sensor and target torque of each of the actuators 21a and 21b, and gains, and outputs the command values to the actuators 21a and 21b, respectively.

Note that as a known technique can be used for the specific method of calculating the command values in the feedback control, detailed descriptions will be omitted.

Then, when it is determined that the entire robot body 10 operates in the free region in the vertical direction, the control unit 11 performs the feedback control on the movement of the robot 4 with a high gain. When it is determined that at least a part of the robot body 10 operates in the unobserved region (may include the case in which the robot body 10 comes into contact with the unobserved region), the control unit 11 performs the feedback control on the movement of the robot body 10 with a gain lower than the gain when the robot body 10 moves in the free region in the vertical direction. When it is determined that at least a part of the robot body 10 operates in the prohibited region in the vertical direction (may include the case in which the robot body 10 comes into contact with the prohibited region), the control unit 11 performs the feedback control on the movement of the robot body 10 with a gain lower than the gain when the robot body 10 operates in the unobserved region.

In this way, when the robot 4 is operated, by changing the gain of the feedback control on the movement of the robot body 10 according to whether or not the region in which the robot body 10 operates has already been observed, the impact force of the robot body 10 is reduced in the unobserved region in which an object not recognized by the robot 4 may come into contact with the robot body 10. Then, if by any chance the robot body 10 comes into contact with the object, an influence on the object can be reduced. As the gain will not be reduced more than necessary in the free region, the robot 4 can be operated highly accurately.

Figure 16:
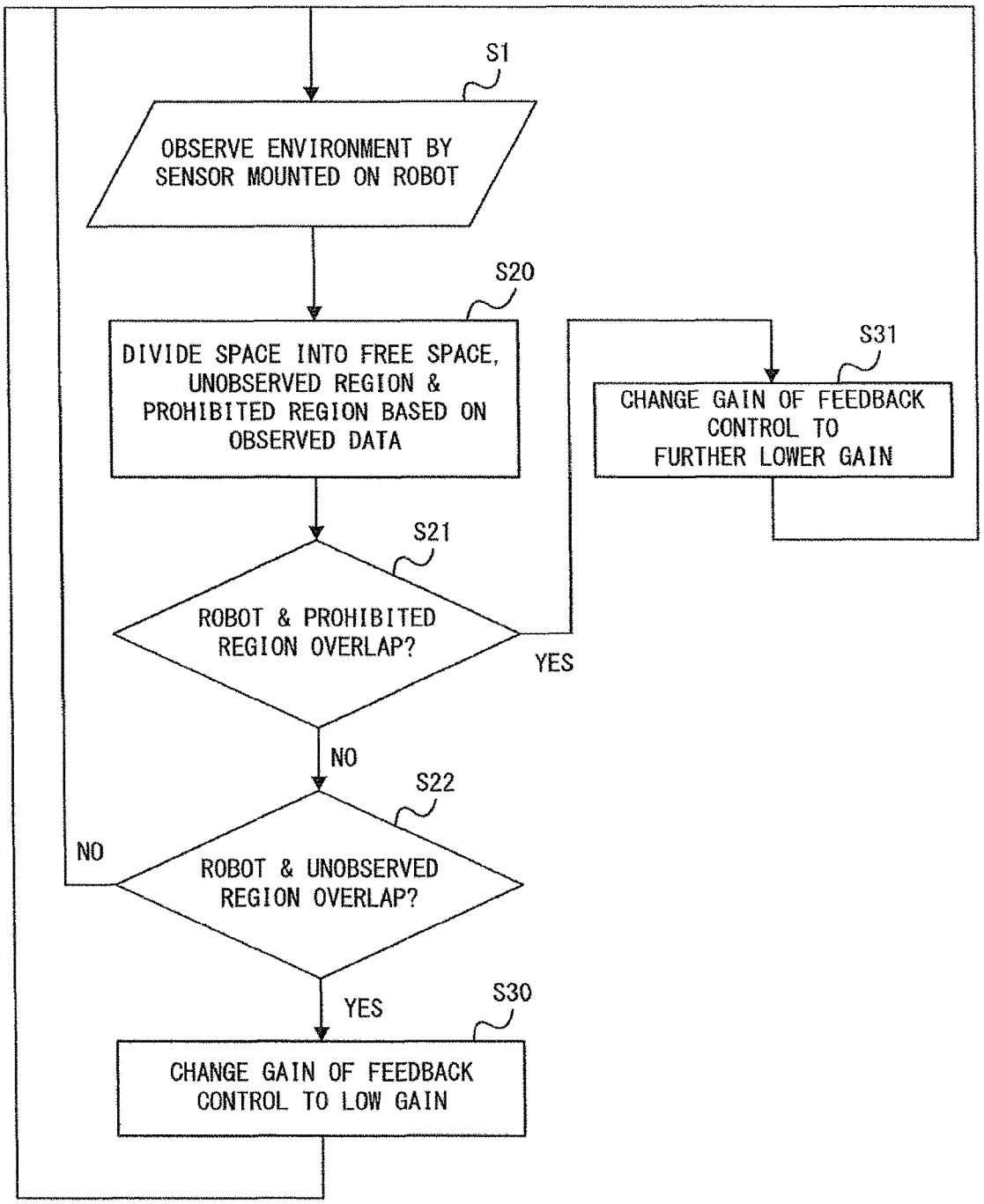
FIG. 16 is a flowchart showing an operation of the robot according to the fourth exemplary embodiment.

Next, the operation of the robot 4 according to the fourth exemplary embodiment will be explained by referring to FIG. 16. FIG. 16 is a flowchart showing the operation of the robot 4 according to the fourth exemplary embodiment. As the steps S1 and S20 to S22 are similar to the processes explained in the first exemplary embodiment by referring to FIG. 8, the same processes are denoted by the same reference numerals, and repeated descriptions will be omitted.

When it is determined that the robot 4 overlaps the unobserved region (S22: YES), the control unit 11 changes the gain of the feedback loop to a lower gain (S30).

When it is determined that the robot 4 overlaps the prohibited region (S21: YES), the control unit 11 changes the gain of the feedback loop to a lower gain (S31). This gain (a second gain) is lower than the gain (a first gain) that has been set in the step S30.

When it is determined that the robot 4 does not overlap the unobserved region (S22: NO), the process returns to the step S1. That is, the control unit 11 does not change the gain of the feedback loop to a lower gain. Accordingly, when the step S30 or S31 is executed, and a low gain is set for the gain of the feedback loop, the control unit 11 changes the gain of the feedback loop to a high gain. This gain (a third gain) is greater than the gain (the first gain) that has been set in the step S30.

Although the fourth exemplary embodiment has been explained so far, the present invention is not limited to the above contents, and various modifications can be made thereto without departing from the scope of the invention. For example, if a low gain is set when it is determined that the robot body 10 overlaps the unobserved region, and it is also determined that the robot body 10 overlaps the prohibited region, it may be configured in such a way that the greater the area A of the part RUM where the robot body 10 overlaps the unobserved region or the prohibited region, the greater the degree of the reduction in the gain. Note that as described in the third exemplary embodiment, when the environment around the robot 4 is captured as the three-dimensional space, this area A may be used in place of the volume of the part RUM where the robot body 10 overlaps the unobserved region or the prohibited region.

Moreover, in the above explanation, although when the robot body 10 overlaps the prohibited region, the gain of the feedback control on the movement of the robot 4 is changed to a lower gain, instead the movement of the robot 4 may be stopped. Further, as described in the third exemplary embodiment, another operation may be executed instead of changing the gain or another operation may be executed in addition to changing the gain.

As has been explained above, in the fourth exemplary embodiment, the gain of the feedback control on the robot 4 is reduced so as to reduce the driving force of the robot 4. That is, various parameters relating to the control of the robots 3 and 4 not only the speed and gain may be controlled as long as the driving forces of the robots 3 and 4 and the force applied on the obstacle when the robots 3 and 4 come into contact with the obstacle can be reduced.

Note that the present invention is not limited to the above exemplary embodiments, and various modifications can be made without departing from the scope of the invention. For example, the above first and second exemplary embodiments and the third and fourth exemplary embodiments can be combined in any way and carried out.

INDUSTRIAL APPLICABILITY

The present application is based upon and claims the benefit of priority from Japanese Patent Application No. 2013-179219, filed on Aug. 30, 2013, the entire contents of which are hereby incorporated by reference.

REFERENCE SIGNS LIST 1, 2, 3, 4 ROBOT
9 OPERATING TERMINAL
10 ROBOT BODY
20 MOVING CARRIAGE
30 ARM
40 HEAD
50 SENSOR
60 GRIP
11 CONTROL UNIT
12 STORAGE UNIT
13 COMMUNICATION UNIT
21a, 21b ACTUATOR
22a, 22b WHEEL
23a, 23b ANGLE SENSOR
31a, 31b ACTUATOR
32a, 32b ANGLE SENSOR
41 ACTUATOR

The invention claimed is:

1. A method of controlling a robot that operates while observing a surrounding environment, the method comprising:
    obtaining environmental information on the environment around the robot to dictate observed and unobserved regions, wherein the unobserved region is a region in which environmental information has not been obtained by the environmental information obtaining sensor;
    determining as to whether the robot is operating in the observed or the unobserved region; and
    reducing a speed at which the robot moves when it is determined that the robot is operating in the unobserved region,
    wherein the robot is operated in a free region when operating within the observed region and it has been determined that an obstacle is not present based on the environmental information,
    wherein the robot is operated in a prohibited region when operating within the observed region and it has been determined that an obstacle is present based on the environmental information,
    wherein when the robot is operated in the prohibited region, reducing the speed at which the robot moves, so that the speed at which the robot moves will be lower than the speed at which the robot moves when the robot is operated in the unobserved region.

2. A robot operating while observing a surrounding environment comprising:
    an environmental information obtaining sensor configured to obtain environmental information on the environment around the robot to dictate observed and unobserved regions, wherein the unobserved region is a region in which environmental information has not been obtained by the environmental information obtaining sensor; and
    a controller configured to reduce a speed at which the robot moves when the robot is operated within the unobserved region,
    wherein the robot is operated in a free region when operating within the observed region and it has been determined that an obstacle is not present based on the environmental information,
    wherein the robot is operated in a prohibited region when operating within the observed region and it has been determined that an obstacle is present based on the environmental information,
    wherein when the robot is operated in the prohibited region, the controller reduces the speed at which the robot moves, so that the speed at which the robot moves will be lower than the speed at which the robot moves when the robot is operated in the unobserved region.

3. The robot according to claim 2, wherein
the controller does not reduce the speed at which the robot moves when the robot is operated in a free region in which the environmental information of the free region has been obtained by the environmental information obtaining sensor and it has been determined that no obstacle is present based on the environmental information.

4. The robot according to claim 3, wherein
the robot comprises a storage to store region information, the region information indicating to which one of the unobserved region, the prohibited region, and the free region each region around the robot belongs,
the controller determines to which one of the unobserved region, the prohibited region, and the free region the region around the robot belongs based on the environmental information obtained by the environmental information obtaining sensor and updates the region information according to a result of the determination, and
the controller determines to which one of the unobserved region, the prohibited region, and the free region a region in which the robot operates belongs based on the region information.

5. The robot according to claim 2, wherein
when the robot is operated in the unobserved region, the controller reduces the speed at which the robot moves in such a way that the greater a volume of the robot included in the unobserved region, the greater a degree of a reduction in the speed at which the robot moves.

6. The robot according to claim 2, wherein
when the robot is operated in the unobserved region, the controller reduces the speed at which the robot moves in such a way that the shorter a distance between the prohibited region and the robot, the greater a degree of a reduction in the speed at which the robot moves.

7. The robot according to claim 2, wherein
the robot further includes an arm,
a case in which the robot is operated indicates a case in which the arm included in the robot is operated, and
a moving speed of the arm included in the robot is reduced as the speed at which the robot moves.

8. The robot according to claim 2, wherein
the robot is a movable robot, and
a case in which the robot is operated is a case in which the robot is moved.

9. The robot according to claim 2, wherein
the robot operates by feedback control, and
the controller reduces a gain of the feedback so as to reduce the speed at which the robot moves.

* * * * *